United States Patent
Bickle et al.

(10) Patent No.: US 9,195,447 B2
(45) Date of Patent: Nov. 24, 2015

(54) OPTIMIZED SCA DESCRIPTORS WITH RUN-TIME DEPLOYMENT ADDITIONS

(71) Applicant: Raytheon Company, Waltham, MA (US)

(72) Inventors: Gerald L. Bickle, Columbia City, IN (US); Susan J. Silver, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/202,794

(22) Filed: Mar. 10, 2014

(65) Prior Publication Data

US 2015/0254068 A1    Sep. 10, 2015

(51) Int. Cl.
  G06F 9/445    (2006.01)
  G06F 9/45     (2006.01)
  G06F 17/30    (2006.01)

(52) U.S. Cl.
  CPC  *G06F 8/61* (2013.01); *G06F 8/427* (2013.01); *G06F 17/30911* (2013.01)

(58) Field of Classification Search
  CPC ...... G06F 8/427; G06F 8/61; G06F 17/30911
  USPC .......................... 717/151–157, 174–175, 143
  See application file for complete search history.

(56) References Cited

U.S. PATENT DOCUMENTS

| 7,278,133 | B2 | 10/2007 | Roman et al. |
| 7,367,020 | B2 | 4/2008 | Bickle et al. |
| 7,526,771 | B2 | 4/2009 | Roman et al. |
| 2003/0114163 | A1 | 6/2003 | Bickle et al. |
| 2010/0070524 | A1 | 3/2010 | Bae et al. |
| 2010/0242020 | A1 | 9/2010 | Cho et al. |
| 2010/0313197 | A1 | 12/2010 | Cho et al. |
| 2012/0284288 | A1 | 11/2012 | Bickle et al. |
| 2013/0097616 | A1 | 4/2013 | Bickle |
| 2013/0139146 | A1 | 5/2013 | Bickle et al. |

OTHER PUBLICATIONS

C. Linn, "Understanding Port connections in the SAD", Jan. 2003, RIT Sr. Project material, Harris Corporation, 2 pages.*
U.S. Appl. No. 13/068,061.
U.S. Appl. No. 13/068,061 .
U.S. Appl. No. 13/373,761.
PCT International Search Report and Written Opinion dated Aug. 31, 2015 corresponding to International Appl. No. PCT/US2015/011894; 15 Pages.
Joint Tactical Networking Center, "Software Communications Architecture Specification 4.0 User's Guide;" Version 1.0; Nov. 7, 2012; 77 Pages.

* cited by examiner

*Primary Examiner* — Ted T Vo
(74) *Attorney, Agent, or Firm* — Daly, Crowley, Mofford & Durkee, LLP

(57) ABSTRACT

Systems and methods for converting Software Communications Architecture (SCA) XML files into optimized SCA descriptors usable by a SCA Core Framework (CF) for application deployment and installation. The optimized SCA descriptors include sufficient run-time information so as to be directly usable by the CF for deploying and executing waveform applications without copying to different structures. The optimized SCA structures include component instantiation direct indexes into a sequence of partitions. The optimized SCA descriptors can be Common Object Request Broker Architecture (CORBA) structures provided in Common Data Representation (CDR) format.

20 Claims, 16 Drawing Sheets

OPTIMIZED SCA DESCRIPTORS WITH RUN-TIME DEPLOYMENT ADDITIONS

BACKGROUND

A software-defined radio (SDR) is a radio whose function is defined not by its underlying hardware, but instead by its software, such that its output signal is determined by software. SDRs are thus reconfigurable, within the limits of the actual underlying hardware capabilities, by loading new software as required by a user. In addition, use of SDR improves interoperability through the adoption of industry standards which allow various applications (referred to as "waveform applications") to operate on any compliant SDR hardware.

The U.S. Department of Defense, through its Joint Tactical Networking Center (JTNC) (formerly the Joint Tactical Radio System), now requires that all radios delivered to the armed forces adhere to the Software Communications Architecture (SCA) Specification for SDR. Several versions of the SCA Specification have been developed. At the time of this writing the latest specification published by the JTNC is SCA 4.0.1 dated Oct. 1, 2012. All published versions of the SCA Specification, including SCA 4.0.1, SCA 4.0, SCA 2.2,2, and SCA 2.2, are available to the public from the JTNC website and are hereby incorporated by reference in their entireties.

A SCA-based SDR includes a Core Framework (CF) implementation to deploy (install and create) waveform applications in a controlled and secured manner. At startup, the CF implementation reads information from a hierarchy of Extensible Markup Language (XML) configuration files, referred to as a Domain Profile, which may include tens of thousands of lines of XML syntax spread over hundreds of files. Parsing a Domain Profile may require substantial computing resources, including processing time and memory usage.

SUMMARY

In accordance with one aspect of the invention, a system comprises a non-transitory memory comprising a pre-parser interface and an optimized interface; an Extensible Markup Language (XML) parser; a Common Object Request Broker Architecture (CORBA) codec; and a pre-parser coupled to the memory and the XML parser and configured to receive Software Communications Architecture (SCA) XML files, parse the XML files using the XML parser into pre-parser structures associated with the pre-parser interface, convert the pre-parser structures to optimized structures associated with the optimized interface, and encode the optimized structures into a CORBA Common Data Representation (CDR) using the CORBA codec, wherein the optimized data types are directly usable by an SCA Core Framework (CF) during application deployment and registration. In embodiments, the pre-parser interface and the optimized interface are associated with a CORBA interface definition language (IDL).

In accordance with another aspect of the invention, a computer-implemented method comprises receiving SCA XML files; parsing the XML files, using an XML parser, into pre-parser structures associated with a pre-parser interface; converting the pre-parser structures to optimized structures associated with an optimized interface; and encoding the optimized structures into a CORBA CDR using a CORBA codec, wherein the optimized data types are directly usable by an SCA CF during application deployment and registration. The method may be provided as a computer program product tangibly embodied in a non-transitory computer-readable medium, the computer-readable medium storing program instructions that are executable to perform the method.

In one embodiment, the optimized structures comprise: a sequence of placement structures associated with one or more <componentplacement> and/or assemblyplacement SCA XML elements; and a referring structure comprising a reference to a placement structure, the reference comprising a direct index into the sequence of placement structures. The referring structure may be associated with one of a <componentinstantation>, <componentfactoryref, <assemblyinstantiation>, <findcomponent>, or an <implementation> SCA XML element. In some embodiments, the pre-parser can be configured to convert a string component reference to the direct index. The placement structure may comprise a CORBA object reference and a process id.

In one embodiment, the optimized structures comprise an implementation structure associated with an <implementation> SCA XML element, the implementation structure comprising a sequence of software dependencies, a sequence of device dependencies, a sequence of visible device dependencies, and a sequence of external device dependencies.

In one embodiment, the optimized structures comprise a usesdevice structure associated with a <usesdevice> SCA XML element, the usesdevice structure comprising a sequence of device dependencies, a sequence of visible device dependencies, and a sequence of external device dependencies. The uses device structure may further comprise an assignedDeviceID associated with a device component instantiation within a DCD.

In one embodiment, the optimized structures comprise a sequence of host collocation structures having a host collocation id, and a sequence of component instantiation ids, wherein the host collocation id is associated with a <hostcollocation> SCA XML element within a Software Assembly Descriptor (SAD), and one or more of the component instantiation ids is associated with a <componentinstantation> SCA XML element within a SAD.

BRIEF DESCRIPTION OF THE DRAWINGS

Various embodiments of the invention may be more fully understood from the following detailed description of the drawings, in which.

DETAILED DESCRIPTION

Before describing exemplary embodiments of the invention, some introductory concepts and terminology used in conjunction with the exemplary embodiments are explained.

Figure 1:
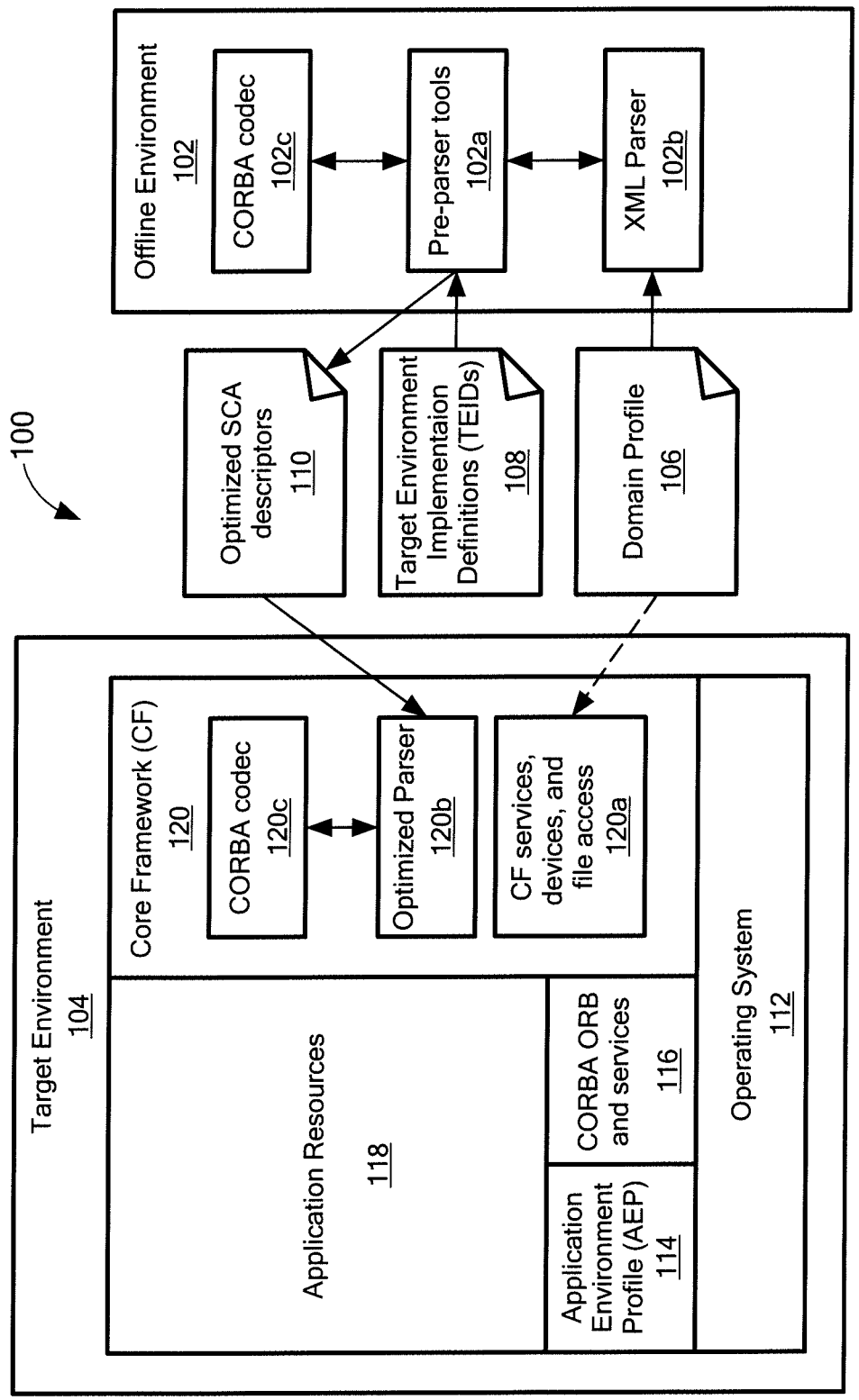
FIG. 1 is a block diagram of an exemplary system for generating and using optimized SCA descriptors.

A SCA-based SDR operating environment (OE) typically comprises an operating system (OS), a middleware, a Core Framework (CF) implementation, SCA services (e.g. file, naming, log, and event services), waveform applications, along with platform devices and services. The CF implementation includes various components, such as a device manager, a domain manager, an application manager, and an application factory component. The middleware is based on the Common Object Request Broker Architecture (CORBA) middleware and includes a CORBA Object Request Broker (ORB). The CORBA specification is published by the Object Management Group (OMG) and available from the OMG website; the CORBA specification is herein incorporated by reference in its entirety. The CF layer includes an interface and an implementation. The interface is defined by the SCA in terms of a CORBA Interface Definition Language (IDL). The CF implementation may be device/platform-dependent and provided by the SDR vendor/supplier. In general, any waveform application that conforms to the CF IDL and Application Environment Profile (AEP), such as AEP 114 in FIG. 1, is compatible with any SCA-based SDR.

One function of the CF layer is to deploy (install and create) a waveform application in a controlled and secured manner. At startup, the CF layer reads information from a configuration (i.e. a Domain Profile) and attempts to deploy platform components and install any previously installed applications, in accordance with relationships defined in the Domain Profile. The Domain Profile is typically provided in XML format, the contents of which are defined by a Document Type Definition (DTD) set forth in the SCA Specification. A Domain Profile may comprise one or more of the following: a Software Assembly Descriptor (SAD), a Device Configuration Descriptor (DCD), a Domain Manager Configuration Descriptor (DMD), a Software Package Descriptor (SPD), a Software Component Descriptor (SCD), and a Properties Descriptor (PRF).

Many existing SCA-based SDRs, such as the SDR described in U.S. Pat. No. 7,367,020 ("the '020 patent"), which is herein incorporated by reference in its entirety, include an XML parser to parse the Domain Profile XML files. In general, the XML files must be parsed each time the SDR is powered on, a waveform application is installed, or a component (i.e. a software component of the waveform application) is registered or deployed, which may result in poor performance of the SDR.

U.S. patent application Ser. No. 13/373,761 ("the '761 application") and Ser. No. 13/068,061 ("the '061 application") describe pre-parsing Domain Profile XML files into optimized CORBA structures, which are encoded into Common Data Representation (CDR) format and written to one or more optimized SCA descriptors. The SCA descriptors are made available to the SDR, which includes an optimized parser to efficiently decode and parse them. Such pre-parsing may be done in an offline environment, separate from the SDR target environment. Advantageously, the Domain Profile XML files do not need to be parsed each time a component is installed within the SDR (or when the SDR is restarted) and the XML parser can be eliminated from the SDR. The '761 and '061 applications each share the same inventors Gerald L. Bickle and Susan J. Silver as the present application and the entire contents of each are hereby incorporated by reference.

The SCA descriptors described in the '761 and '061 applications do not include sufficient run-time information, meaning the structures cannot be directly used by a CF implementation for deploying and registering waveform application and components thereof. Thus, information in those structures may need to be convert or copied to different run-time structures for use by the CF implementation. Moreover, the SCA descriptors described in those applications include indirect component instantiation references based on Universally Unique Identifier (UUID) strings. To resolve the component instantiation references, existing CF implementations must search nested data structures at run-time to locate a component or device. Such searches are computationally inefficient because they require a potentially large number of string comparisons.

It should be understood that, in the following description, detailed explanations are not provided in every instance for terms of art that can be located and explained in the aforementioned SCA Specification. Further, terms presented between pairs of angled brackets (e.g. <softpkg>) refer to XML elements defined within the SCA Specification, generally within the Domain Profile DTD described therein. It should further be understood that, as used herein, the term "optimized" is generally used to describe systems and methods which are relatively more efficient than existing systems and methods known in the art.

FIG. 1 shows a system 100 for generating and using optimized SCA descriptors. The system generally includes an offline environment 102 and a target environment 104. The offline environment 102 may be implemented within a general-purpose computer environment, including but not limited to an x86 platform running Linux, Windows, Unix, Solaris, HP-UX, or Mac OS X. The target environment 104 is an SCA-based SDR implemented on any suitable hardware device or embedded system which meets the requirements set forth in the SCA Specification (e.g. a target environment should implement the Portable Operating System Interface (POSIX) interface). In general, the offline environment 102 reads in a Domain Profile 106 and Target Environment Implementation Definitions (TEIDs) 108 and generates one or more optimized SCA descriptors 110.

In an exemplary embodiment, the Domain Profile 106 is provided as a hierarchy of XML files, in accordance with the SCA Specification, the TEIDs 108 are provided as one or more XML files, as set forth in the '761 application, and the optimized SCA descriptors 110 are generated as one or more octet-encoded files. However, it should be appreciated that the Domain Profile, TEIDs, and optimized SCA descriptor can be provided in any suitable form. In one embodiment, the optimized SCA descriptors 110 include an optimized SAD 312, an optimized DCD 314, and an optimized DMD 316, as discussed further below in conjunction with FIG. 3.

A TEID 108 includes information about one or more target environments. As described in the SCA Specification, a SPD can specify more than one component implementations (defined using <implementation> elements), although only one component implementation is applicable for a given target environment. Each <implementation> element includes sub-elements (e.g. <os> and <processor> elements) indicating certain processing requirements for that implementation. In addition, an <implementation> element may include dependencies to other components and devices. As further described in the SCA Specification, a target environment's processing capabilities (e.g. operating system and processor type) may be defined as "device allocation properties," such as within a PRF provided within the target environment. Thus, in some SCA systems, the applicable component implementation is determined at run-time within the target environment based upon the device allocation properties. In exemplary embodiments, the TEIDs 108 include device allocation properties for one or more target environments 104 and the pre-parser tools 102a are configured to determine the applicable <implementation> element based thereupon. For example, an operator may specify a particular target environment, and the pre-parser tools 102a are configured to determine the applicable <implementation> element using device allocation properties using the TEIDs 108.

The offline environment 102 may be external to, and distinct from, the target environment 104 and can be implemented and run on a computer system that is separate/remote from the target environment. Although the target environment 104 uses the optimized SCA descriptors 110 generated by the offline environment, the environments do not need to be in operable communication with each other. Rather, as one of a skill in the art will appreciate, there are various mechanisms to enable the generated descriptors 110 to be made accessible to the target environment 104. For example, in embodiments wherein the optimized SCA descriptors 110 are files, the descriptors may be made accessible by copying/moving files between environments, copying files to a remote location accessible by the target environment 104, and/or by using a shared file system, such as a Network File Service (NFS)-based file system.

Figure 5:
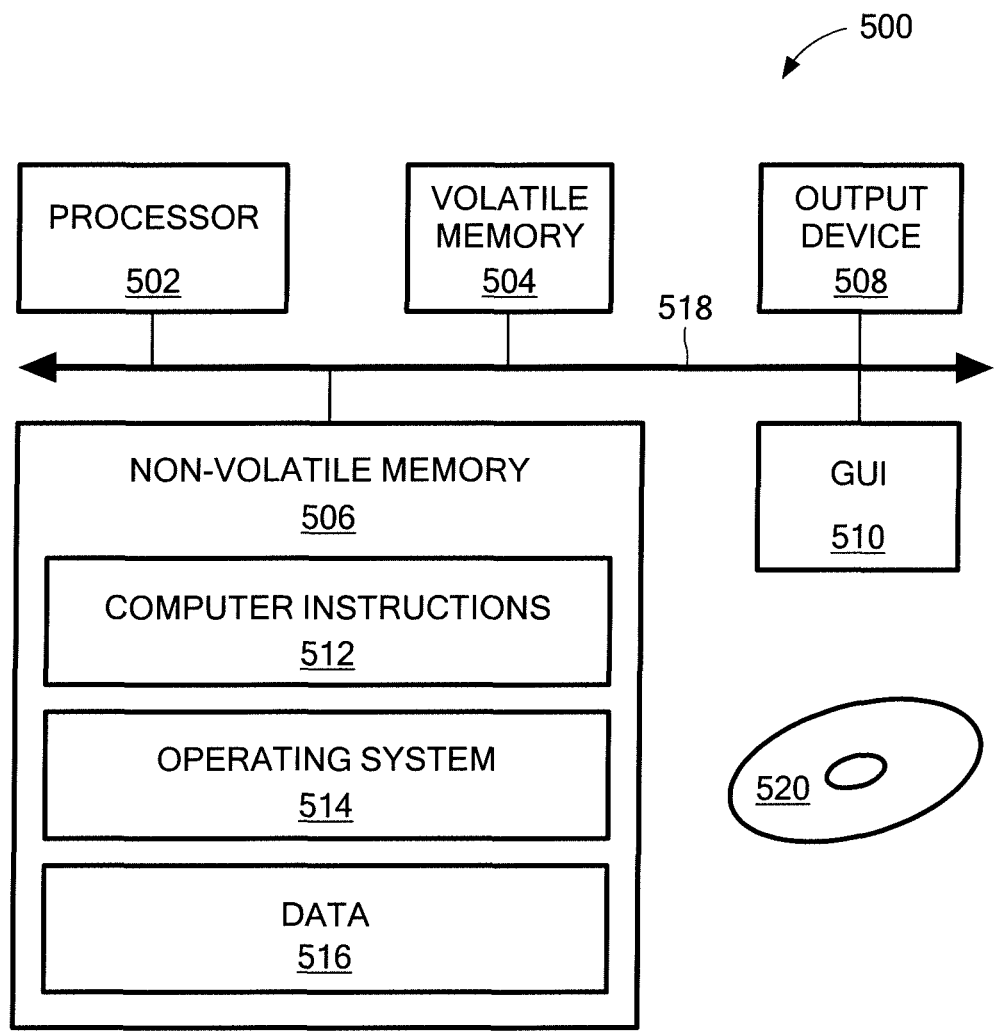
FIG. 5 is a schematic representation of an exemplary computer that can form a part of the system of FIG. 1.

The offline environment 102 includes pre-parser tools 102a, an XML parser 102b, and a CORBA codec 102c, which may be provided as one or more user applications and/or libraries which are executable upon a general-purpose operating system and general-purpose computer system, such as the exemplary computer system 500 of FIG. 5. The offline environment 102 may include other elements, which are not shown in FIG. 1 for simplicity of explanation.

The XML parser 102b may be provided as any suitable commercial off-the-self (COTS) or open-source XML parser, such as a parser based on the Apache Xerces™ project. The CORBA codec 102c may comprise any application or component thereof capable of converting CORBA-based data structures into CDR format and copying the data into an octet stream; those in the art will appreciate that such functionality is provided in many COTS and open-source CORBA software packages.

The pre-parser tools 102a include software to parse the Domain Profile 106 (using the XML parser 102b) and to generate the optimized SCA descriptors 110 (using the CORBA codec 102c). The software may comprise interfaces, structures, unions, typedefs, and enumerations (generally referred to herein as "types") defined within one or more CORBA IDL modules. In an exemplary embodiment, a pre-parser IDL module comprises types (generally shown in FIGS. 2-2C and 3-3F) used to parse the Domain Profile and generate (i.e. form and encode) optimized SCA descriptors, and an optimized parser IDL module comprises types (generally shown in FIGS. 3-3F) used to parse (and decode) the optimized SCA descriptors. In embodiments, the pre-parser IDL module references and/or includes types defined within the optimized parser IDL module. It should be appreciated that the pre-parser tools 102a may be provided as a single dedicated application, a plurality of dedicated applications, or components/libraries included within a more comprehensive application.

The pre-parser tools 102a have access to the Domain Profile 106 and TEIDs 108, such as via a file system, and are in operable communication with the CORBA codec 102c. The CORBA codec 102c may be included within the pre-parser tools 102a (i.e. as a statically-linked or a dynamically-linked library), or provided as a separate application. Although the Domain Profile 106 and TEIDs 108 are shown external to the offline environment 102 in FIG. 1, it should be appreciated that these resources may be included within the target environment 102. The operation of the pre-parser tools 102a is discussed further below in conjunction with FIGS. 4-4F.

The target environment 104 includes various components, services, interfaces, and resources required by the SCA Specification, including an OS 112, an AEP 114, a CORBA ORB and related services 116, application resources 118, and a CF 120. The various components and services are in operable communication with each other, as set forth in the SCA Specification. The target environment 104 may include other software and hardware elements, which are excluded from FIG. 1 for simplicity of explanation.

It should be appreciated by those in the art that the OS 112, AEP 114, and CORBA ORB 116 are provided as part of a SCA-defined operating environment (OE). As is known in the art, SCA OEs are available as COTS products.

The CF 120 represents a Core Framework implementation that complies with the SCA Specification and is adapted to utilize certain optimizations described herein. The CF 120 includes SCA-defined services and components, including software-based services and components ("components") to interface with radio hardware ("devices") and to provide file access (e.g. 120a in FIG. 1). In addition, the exemplary CF 120 includes an optimized parser 120b in operable communication with a CORBA codec 120c, which may be similar to the CORBA codec 102c discussed above in conjunction with the offline environment 102. The CF implementation is configured to receive and parse (using the CORBA codec 120c) optimized SCA descriptors 110. Moreover, the CF implementation is configured to use the optimized descriptor information, such as directly referencing component instantiations using direct index information and using optimized host collocation information. Such optimizations are discussed in detail below.

The optimized parser 120b includes software to parse and utilize the optimized SCA descriptors 110 (using the CORBA codec 120c). The software may comprise types defined within a CORBA IDL module. In an exemplary embodiment, the same optimized parser IDL module used within the pre-parser tools 102a to generate the optimized SCA descriptors 110 and also within optimized parser 120b to parse those descriptors. The optimized parser 120b has access to the optimized SCA descriptors 110 generated by the offline environment 102. In general operation, the optimized parser 120b receives the optimized SCA descriptors 110, decodes the descriptors using the CORBA codec 120c into types defined by the optimized parser IDL module. Advantageously, these types include sufficient run-time information such that they can be used directly by the CF during run-time without converting/copying information into different structures.

In some embodiments, the target environment 104 has access to the Domain Profile (provided as XML files) 106, even though nothing is done with them, because the SCA defines CF interfaces that reference such files.

FIGS. 2-2C and 3-3F illustrate various types used by the pre-parser tools 102a and/or optimized parser 120b (FIG. 1), according to exemplary embodiments of the invention. It should be appreciated that some of these types reference other types and, for convenience of explanation, not all referenced types are shown in the several figures. The referenced types can be generally grouped into three categories: standard CORBA types, i.e. types defined in the CORBA specification; SCA-defined types, i.e. types defined within the SCA Specification, or more specifically within the CF IDL provided therein; and custom types defined within the system 100, i.e. within a pre-parser IDL module and/or an optimized descriptor IDL module. Non-limiting examples of standard CORBA types used in FIGS. 2-2C and 3-3F include CORBAString, CORBABoolean, CORBALong, CORBAObjref, and CORBA Simple Type Sequences.

Figure 2:
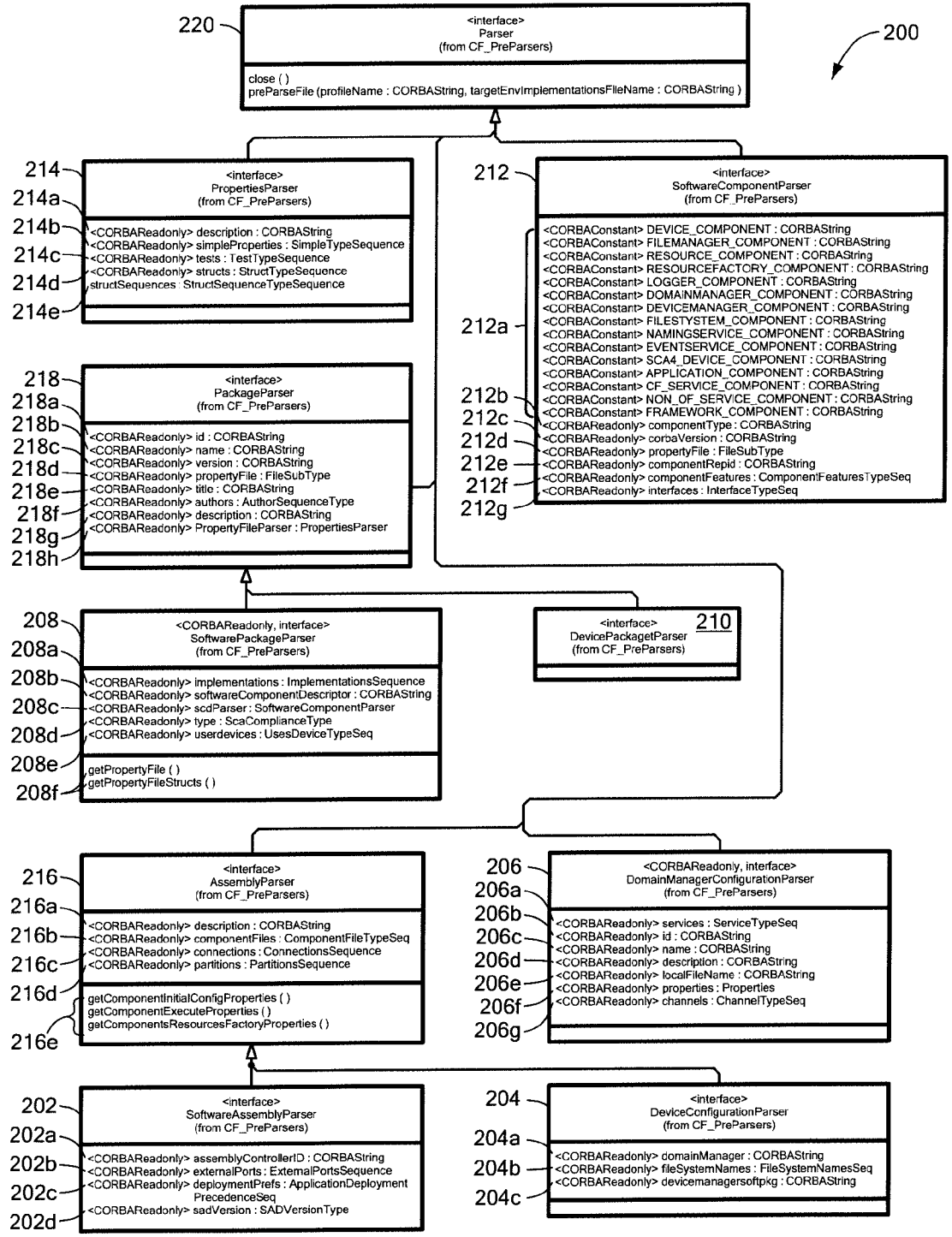
FIGS. 2-2C are diagrams of exemplary types to parse a SCA Domain Profile.

Referring now to FIG. 2, a plurality of exemplary pre-parser interfaces 200 are shown. In an exemplary embodiment, the interfaces 200, along with the various types shown in FIGS. 2A-2C may be defined within a CORBA IDL module. A SoftwareAssemblyParser interface 202, used to parse SADs, includes an assemblyControllerID 202a, externalPorts 202b, deploymentPrefs 202c, and a sadVersion 202d. The assemblyControllerID 202a comprises a string indicating the assembly controller component instantiation to use for assembly; thus, it may correspond to an "id" attribute of a <componentinstantiation> element (also defined with the SAD). The externalPorts 202b corresponds to an <externalports> element and uses an ExternalPortsSequence type discussed further below in conjunction with FIG. 2A. The deploymentPrefs 202c corresponds to a <deploymentprefs> element and may refer to an Application Deployment Descriptor (ADD), as set forth in the SCA 4.0 specification. The deploymentPrefs 202c uses an ApplicationDepoymentPrecedenceSeq type shown in FIG. 3E and described below in connection therewith. The sadVersion 202d represents the SCA version associated with the SAD (e.g. "2.2.2" or "4.0.1"). Although the SCA Specification does not require that a SCA version is included within a SAD, this value is provided for use by the CF 120 (FIG. 1), as discussed further below in connection with FIG. 3.

A DeviceConfigurationParser interface 204, used to parse DCDs, includes a domainManager 204a, fileSystemNames 204b, and a devicemanagerssoftpkg 204c corresponding to <domainmanager>, <filesystemname>, and <devicemanagerssoftpkg> elements within a <deviceconfiguration> element, respectively. It should be appreciated that the SCA Specification (4.0 and above) allows a domain manager component to be specified using several different mechanisms (i.e. the <domainmanager> element includes a "type" attribute which specifies a mechanism). The DeviceConfigurationParser interface 204 supports any mechanism using the domainManager string 204a.

The exemplary SoftwareAssemblyParser interface 202 and DeviceConfigurationParser interface 204 inherit from an AssemblyParser interface 216, meaning that the interfaces 202 and 204 include the members and operations defined with the inherited-from ("parent") interface 216. The AssemblyParser interface 216 includes members, such as a description 216a, componentFiles 216b, connections 216c, partitions 216d, and operations 216e to access the information contained within these members (referred to herein as "accessor operations"). The description 216a, componentFiles 216b, connections 216c, and partitions 216d generally correspond to <description>, <componentfiles>, <connections>, and <partitioning> elements within a <softwareassembly> or <deviceconfiguration> element, respectively. The connections 216c utilize a ConnectionsSequence type 260 shown in FIG. 2B and described below in connection therewith. The partitions 216d utilize a PartitionsSequence type 320 shown in FIG. 3A and described below in connection therewith.

A DomainManagerConfigurationParser interface 206, used to parse DMDs, includes services 206a, an id 206b, a name 206c, a description 206d, a localFileName 206e, properties 206f, and channels 206g. The services 206a, id 206b, name 206c, description 206d, and localFileName 206f correspond to a <services> element, an "id" attribute, a "name" attribute, a <description> element, and a <domainmanagersoftpkg> element within a <domainmanagerconfiguration> element, respectively. The properties 206f, which uses the SCA-defined CF::Properties type, represents the properties defined within the SPD identified by the localFileName 206f and its corresponding PRF.

As is known in the art, a Domain Profile allows properties to be defined at several levels. For example, software component properties may be specified within an associated SCD, SPD, and/or SAD; in general, the same property can be defined in several places. The SCA defines precedence rules to determine which of the several definitions is used during run-time (e.g. see SCA version 2.2.2 section D.2.1 Software Package, D.6.1.3.3).

For efficiency, the pre-parser tools 102a (FIG. 1) can merge together the various properties using the SCA-defined precedence rules and, thus, the properties 206f may represent the properties in correct precedence order. As a further optimization, the pre-parser tools 102a can convert the property values to the associated run-time types, so that no further conversion is required when they are used with the target environment 104 (FIG. 1). Exemplary techniques for performing such optimizations are described in the '716 application.

A SoftwarePackageParser interface 208, used to parse SPDs, includes implementations 208a, a softwareComponentDescriptor 208b, a scdParser 208c, a type 208d, usesdevices 208e, and a plurality of accessor operations 208f. The implementations 208a, softwareComponentDescriptor 208b, and type 208d correspond to an <implementations> element, a <descriptor> element, and a "type" attribute, respectively, within a <softpkg> element. The scdParser 208c refers to a SoftwareComponentParser instance 212 used to parse a SCD identified by the softwareComponentDescriptor 208b. The usesdevices 208e refers to a <usesdevices> element within a <softpkg> element and may utilize a UsesDeviceType 330 type shown in FIG. 3B and described below in connection therewith.

The SoftwarePackageParser interface 208 and a DevicePackageParser interface 210 inherit from a PackageParser interface 218 which includes an id 218a, a name 218b, a version 218c, a propertyFile 218d, a title 218e, authors 218f, a description 218g, and a propertyFileParser 218h. The id 218a, name 218b, and version 218c correspond to "id," "name," and "version" attributes, respectively, of a <softpkg> or <devicepkg> element. The title 218e, authors 218f, and description 218g correspond to a <title>, <author>, and <description> elements, respectively, within a <softpkg> or <devicepkg> element. The propertyFile 218d corresponds to a <propertyfile> element within a <softpkg> element. The propertyFileParser 218h is an instance of a PropertiesParser interface 214 used to parse the PRF identified by the propertyFile 218d. The PropertiesParser interface 214 is described hereinbelow.

A SoftwareComponentParser interface 212, used to parse a SCDs, includes a componentType 212b, a corbaVersion 212c, a propertyFile 212d, a componentRepid 212e, componentFeatures 212f, and interfaces 212g, which correspond to a <componenttype>, <corbaversion>, <propertyfile>, <componentrepid>, <componentfeatures>, and <interfaces> element, respectively, within a <softwarecomponent> element. The SoftwareComponentParser 212 further includes a plurality of constants 212a, as shown.

A PropertiesParser 214, used to parse PRFs, includes a description 214a, simpleProperties 214b, tests 214c, structs 214d, and structSequences 214e which correspond to a <description>, <simplesequence>, <test>, <struct>, and <structsequence> elements, respectively, within a <properties> element.

The pre-parser interfaces 200 may be used within the pre-parser tools 102a of FIG. 1. In an exemplary embodiment, the SoftwareAssemblyParser interface 202, SoftwarePackageParser interface 208, SoftwareComponentParser interface 212, PropertiesParser interface 214, and their respective parent interfaces are used by the pre-parser tools to parse SADs; the DeviceConfigurationParser interface 204, SoftwarePackageParser interface 208, DevicePackageParser interface 210, SoftwareComponentParser interface 212, interface PropertiesParser 214, and their respective parent interfaces are used to parse DCDs; and the DomainManagerConfigurationParser interface 206, SoftwarePackageParser interface 208, SoftwareComponentParser interface 212, PropertiesParser interface 214, and their respective parent interfaces are used to parse DMDs.

It should be appreciated that, in addition to using the respective interfaces 200, the pre-parser tools 102*a* also include implementations for one or more of the interface attributes and operations. For example, in exemplary embodiments, each of the interfaces 200 inherits from a Parser interface 220 having a preParseFile( ) operation. The pre-parser tools 102*a* implement the preParseFile( ) operations to parse a given Domain Profile XML file (i.e. the XML file hierarchy specified by the "profileName" parameter) using the XML parser 102*b* and a specified TEID 108 (i.e. the TEID file specified by the "targetEnvImplementationsFileName" parameter). Relevant information from the Domain Profile is copied into to the various interface implementation data structures. In an exemplary embodiment, a CORBA IDL compiler is used to generate stub and/or skeleton code for use within the pre-parser tools 102*a* and optimized parser 120*b*.

Figure 2A:
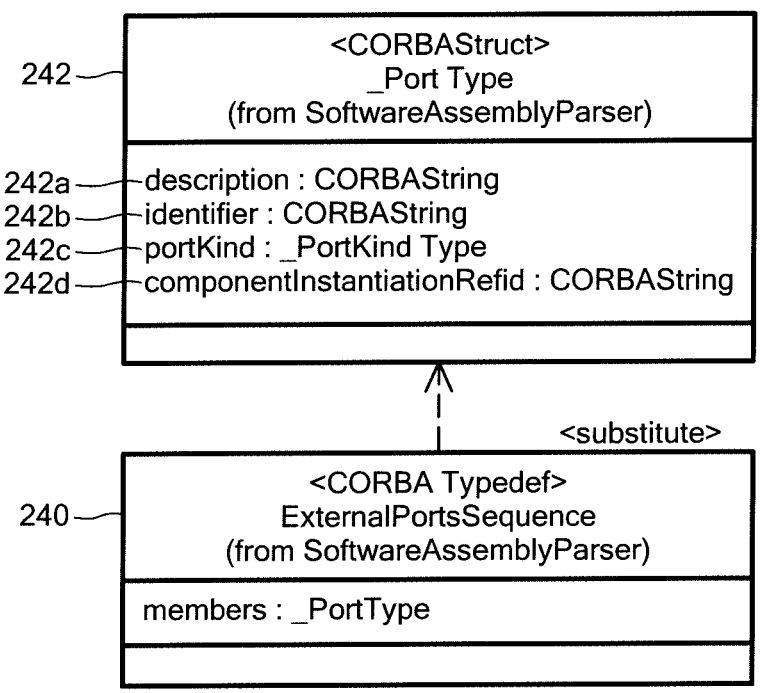

Referring now to FIG. 2A, an exemplary ExternalPortsSequence type 240, which corresponds to a SAD <externalports> element, represents a sequence of visible ports for a software assembly. A PortType structure 242, which corresponds to a <port> element within an <externalports> element, represents a single visible port and includes a description 242*a*, an identifier 242*b*, a portKind 242*c*, and a componentInstantiationRefId 242*d*. The description 242*a* and componentInstantiationRefId 242*d* correspond to <description> and <componentinstantiaionref> elements, respectively, within a <port> element. The componentInstantiationRefId 242*d* may be a string identifying a component instantiation within the software assembly. The portKind 242*c* comprises an enumeration indicating whether the port is identified by a <usesidentifier>, a <providesidentifier>, or a <supportedidentifier> element; and the identifier 242*b* is the corresponding port identifier value.

Figure 2B:
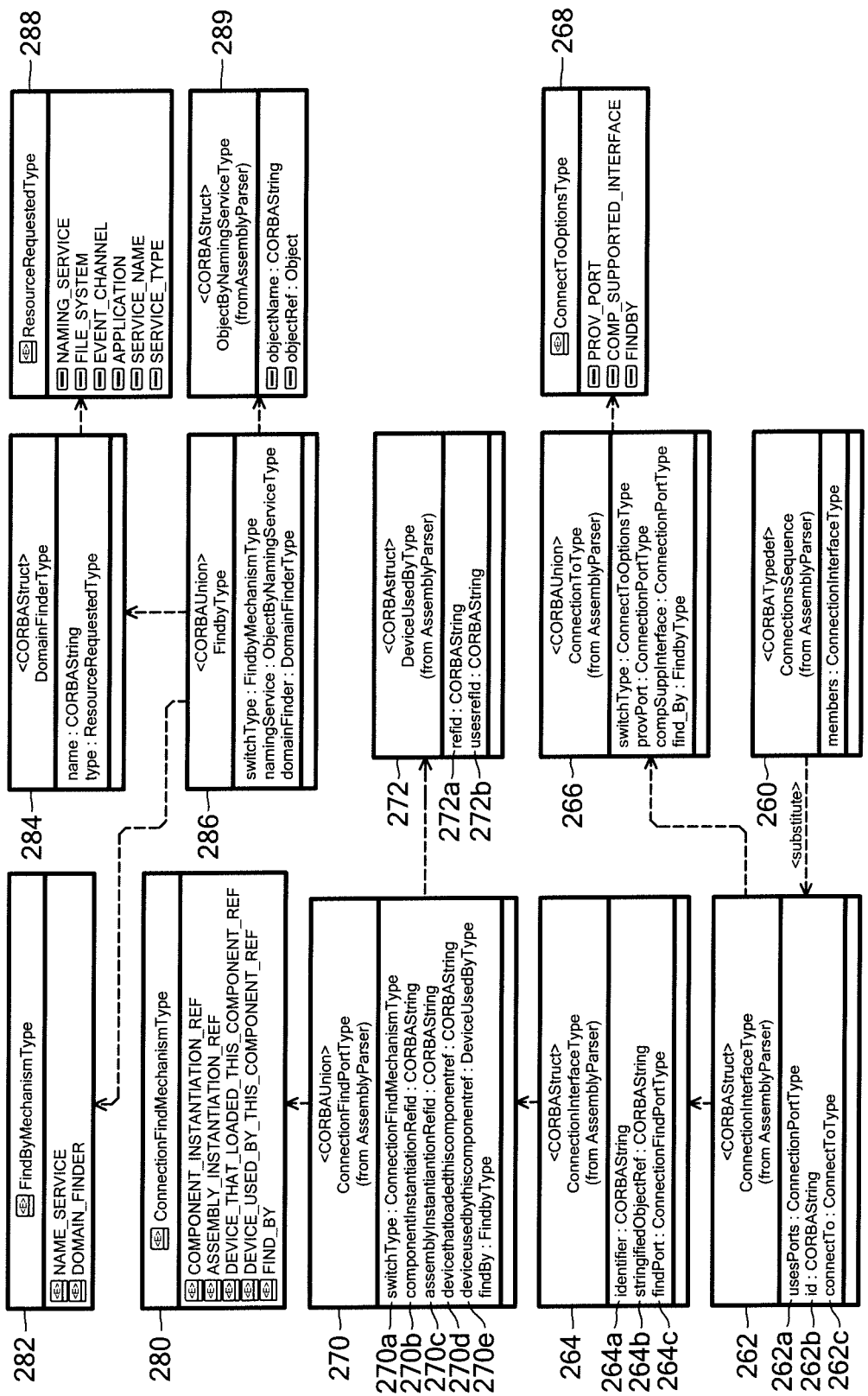

Referring now to FIG. 2B, exemplary types 260-288 are provided for use within one or more of the pre-parser interfaces 200 of FIG. 2. A ConnectionsSequence type 260, for use within an AssemblyParser interface 216, corresponds to a <connections> element within a <softwareassembly> element or a <deviceconfiguration> element. The ConnectionsSequence type includes a sequence of ConnectionInterfaceTypes structures 262, corresponding to <connectioninterface> elements. The ConnectionInterfaceType structure 262 includes a usesPorts member 262*a*, an id 262*b*, and a connectTo 262*c*. The usesPorts member 262*a*, which utilizes a ConnectionPortType 264, corresponds to a <usesport> element within a <connectioninterface> element. The id 262*b* corresponds to an "id" attribute within a <connectioninterface> element. The connectTo 262*c* represents one of a <providesport>, a <componentsupportedinterface>, or a <findby> element within a <connectioninterface> element, and utilizes the ConnectToType 266 and ConnectToOptionsType 268 types shown.

A ConnectionPortType structure 264 includes an identifier 264*a*, a stringifiedObjectRef 264*b*, and a findPort 264*c*. The identifier 264*a* corresponds to a <usesidentifier> element with a <usesport> element. The findPort 264*c*, which utilizes a ConnectionFindPortType 270, corresponds to one of a <componentinstantiationref>, <assemblyinstantiationre (for SCA 4.0 and above), <devicethatloadedthiscomponentref>, <deviceusedbythiscomponentre, or <findby> element within a <usesport> element. The stringifiedObjectRef 264*b* may correspond to a <stringifiedobjectref> within a <providesport> element (for SCA 4.0 and above).

A ConnectionFindPortType union 270 identifies a specific component's port using one of the several different mechanisms described in the SCA Specification. The ConnectionFindPortType union 270 includes a switchType 270*a*, a componentInstantiationRefId 270*b*, an assemblyInstantiationRefId 270*c*, a devicethatloadedthiscomponentref 270*d*, a deviceusedbythiscomponentref 270*e*, and a findBy 270*f*. The switchType 270*a* specifies the identification mechanism using the enumeration ConnectionFindMechanismType 280. One of the componentinstantiationRefId 270*b*, assemblyInstantiationRefId 270*c*, devicethatloadedthiscomponentref 270*d*, deviceusedbythiscomponentref 270*e*, or findBy 270*f* is used to specify the component instance. The componentinstantiationRefId 270*b*, assemblyInstantiationRefId 270*c*, and devicethatloadedthiscomponentref 270*d* members may specify the component instance using a string. The deviceusedbythiscomponentref 270*e* uses a DeviceUsedByType 272 type to specify the component instance id, also using a string. The findBy 270*f*, which corresponds to a <findby> element within a <usesport> element, uses various types 282, 284, 286, and 288 to locate the component using a domain manager. It will be appreciated that the types 282, 284, 286, and 288 shown in FIG. 2B may be the same as or similar to types 375, 376, 377, 378, and 379, respectively, which are shown in FIG. 3C.

Figure 2C:
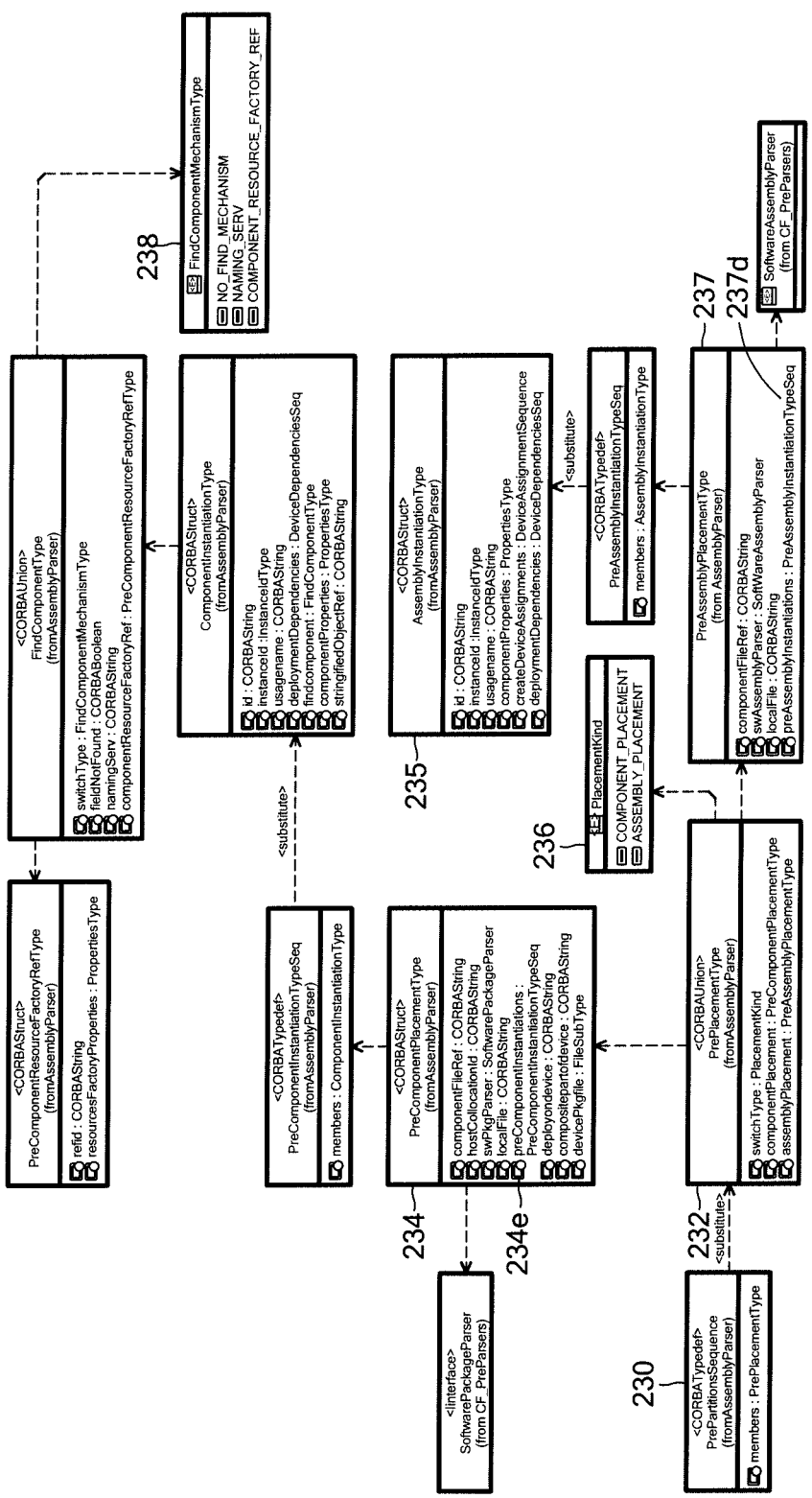

Referring now to FIG. 2C a PrePartitionsSequence type 230 and various related types (as shown) represent partitioning information in a SAD or a DCD. The pre-parser tools use the PrePartitionsSequence type 230 to parse SADs and DCDs and form an optimized PartitionsSequences 320, which are show in FIG. 3A and describe below in connection therewith. A PrePartitionsSequence type 230 corresponds to an optimized PartitionsSequence type 320, a PrePlacementType 232 corresponds to an optimized PlacementType 322, and a PreComponentPlacementType 234 corresponds to an optimized ComponentPlacementType 324, which corresponding types are shown in FIG. 3A. A PlacementKind type 236 includes constants used by the PrePlacementType 232 (FIG. 2C) and the optimized PlacementType 322 (FIG. 3A). For simplicity of explanation, certain types shown in FIG. 2C which correspond to types shown in FIG. 3A are not described herein. For example, it should be appreciated that the FindComponentMechanismType 238 shown in FIG. 2C may be the same as or similar to the FindComponentMechanismType 321 in FIG. 3A.

After reading the description above, it should be appreciated that the pre-parser IDL types shown in FIGS. 2-2C can be used to parse and represent relevant portions of a Domain Profile in accordance with the SCA Specification.

Figure 3:
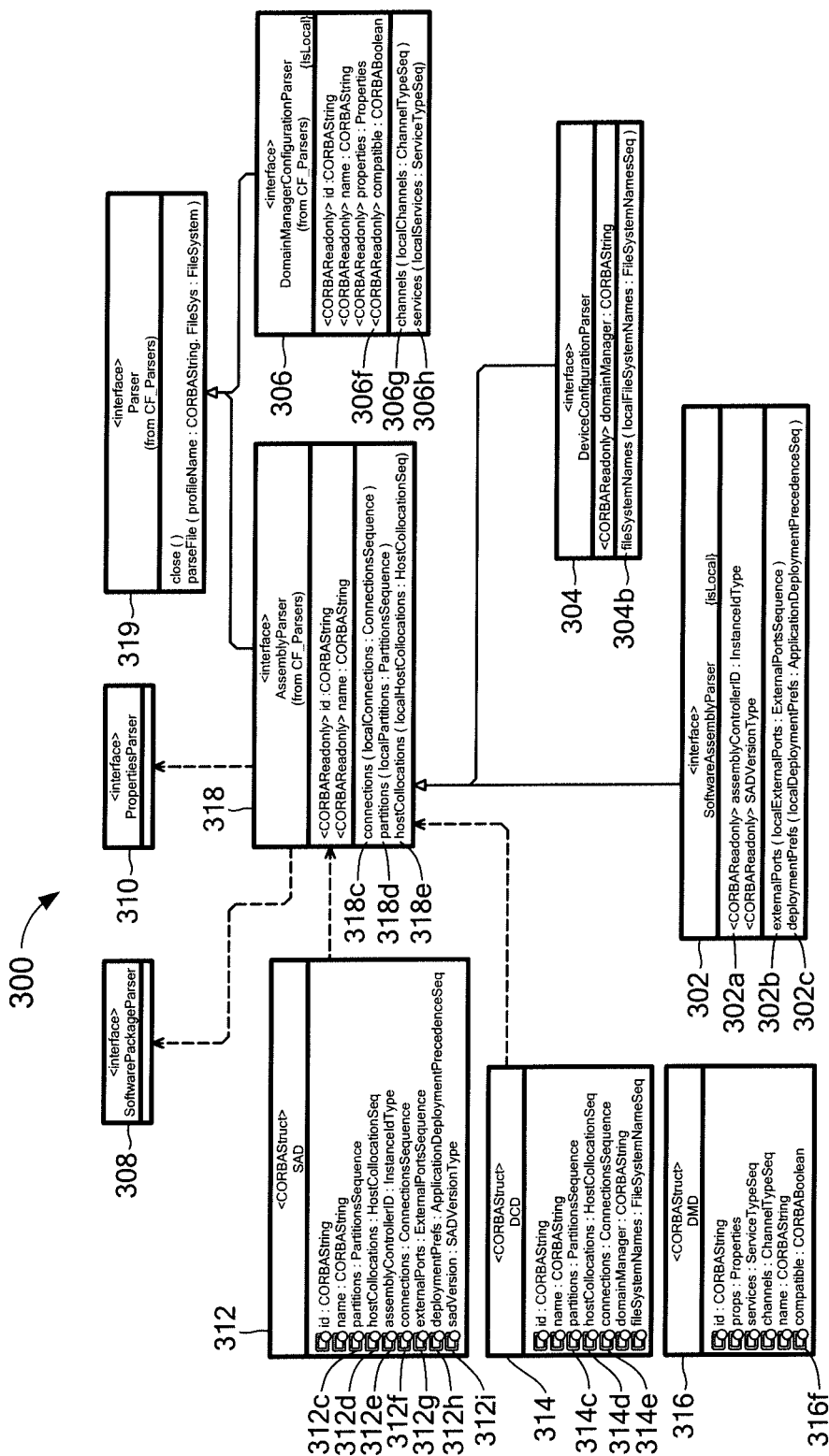
FIGS. 3-3F are diagrams of exemplary types to generate, parse, and use optimized SCA descriptors.
Figure 3A:
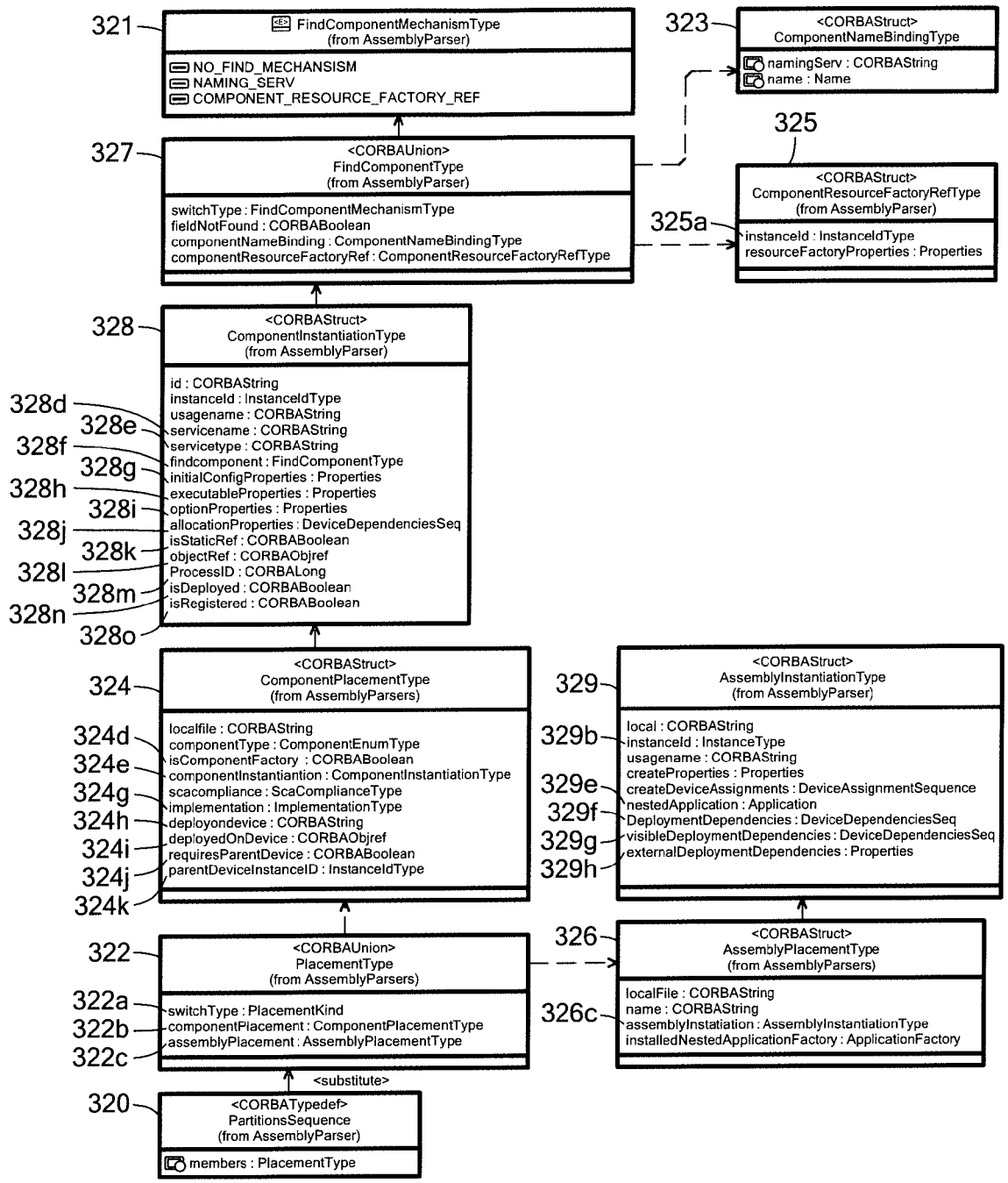
Figure 3B:
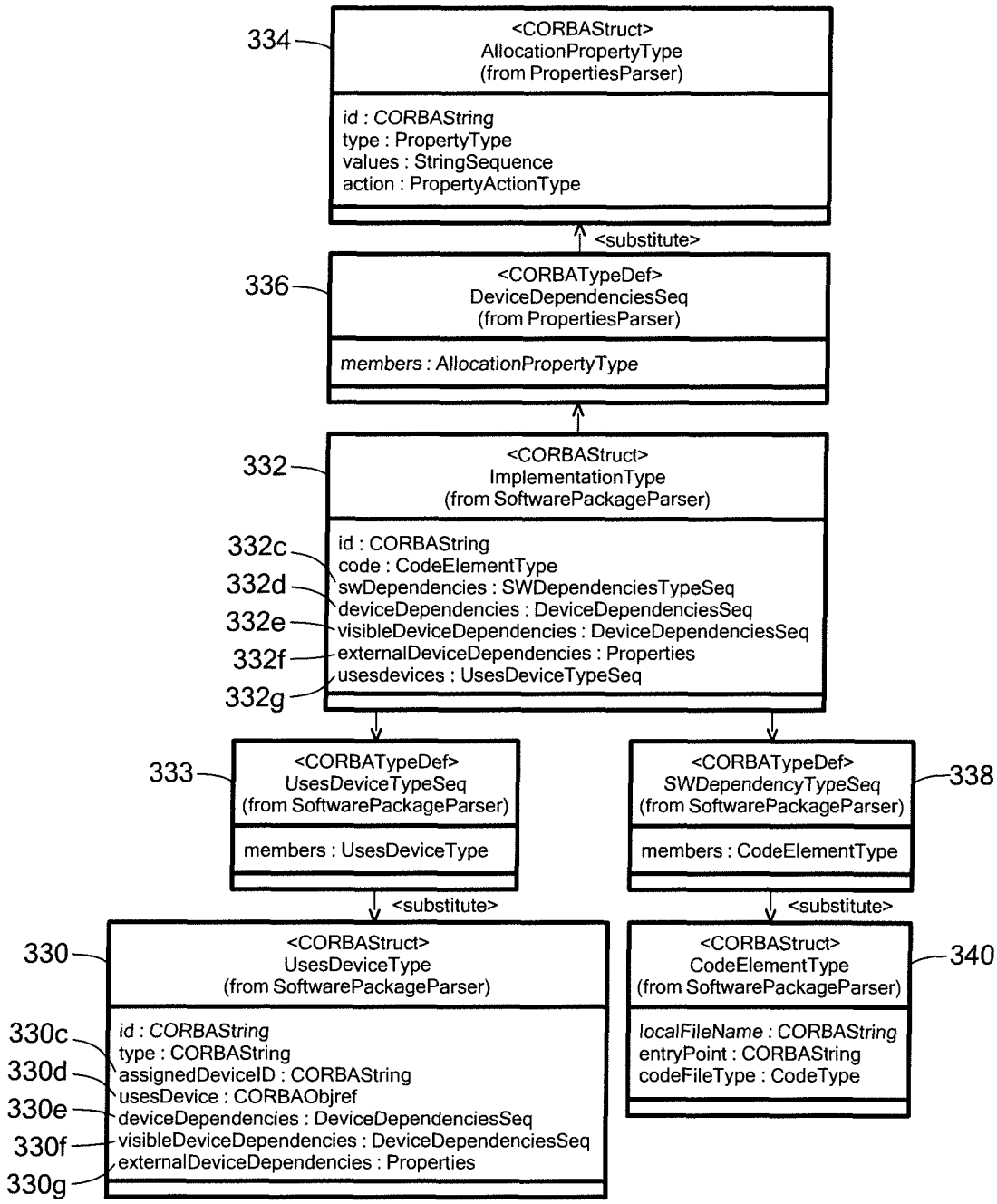
Figure 3C:
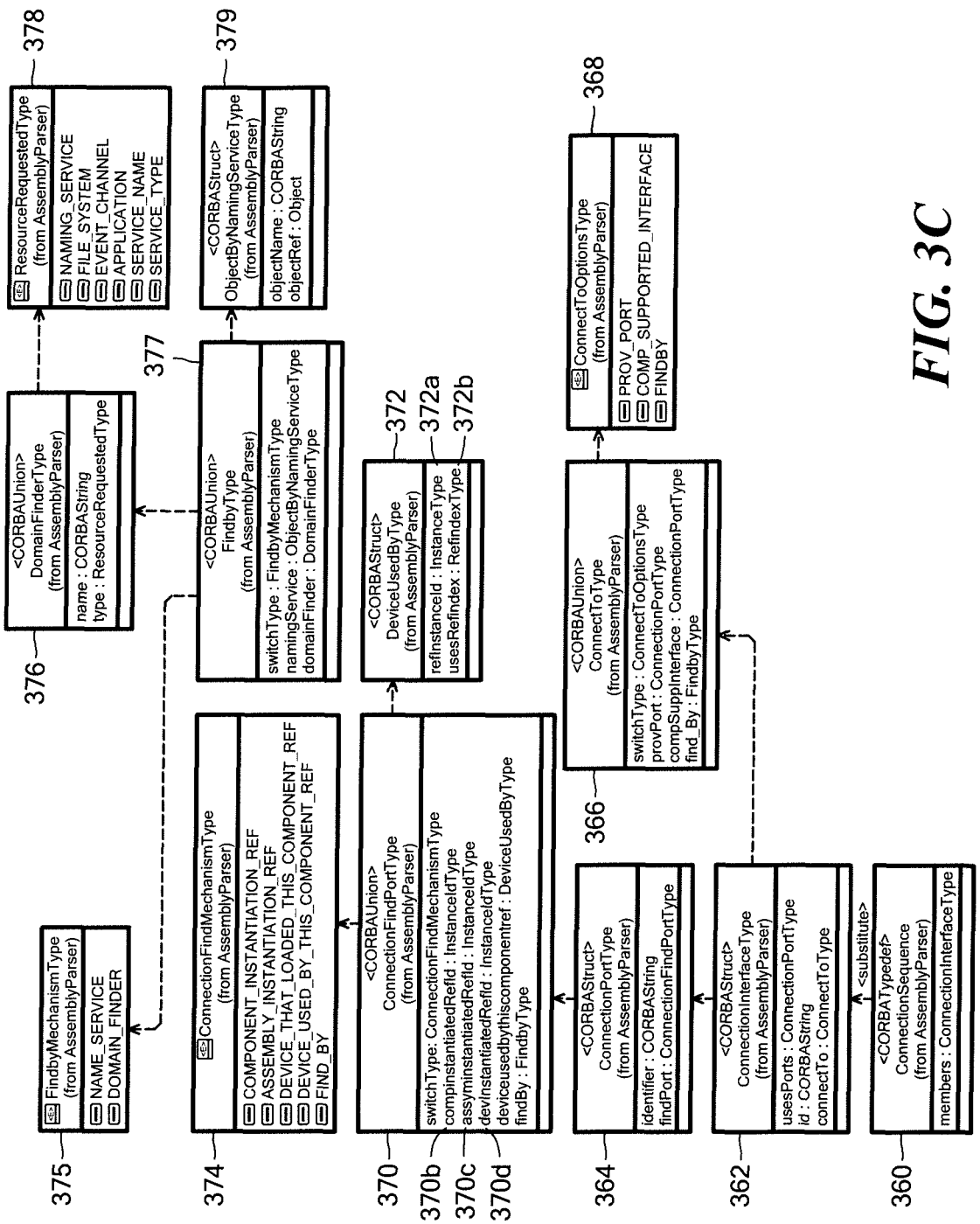
Figure 3D:
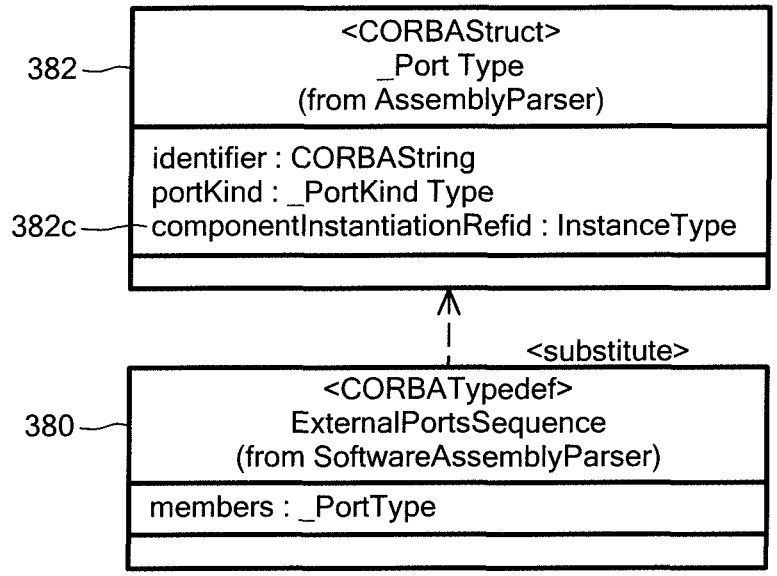
Figure 3E:
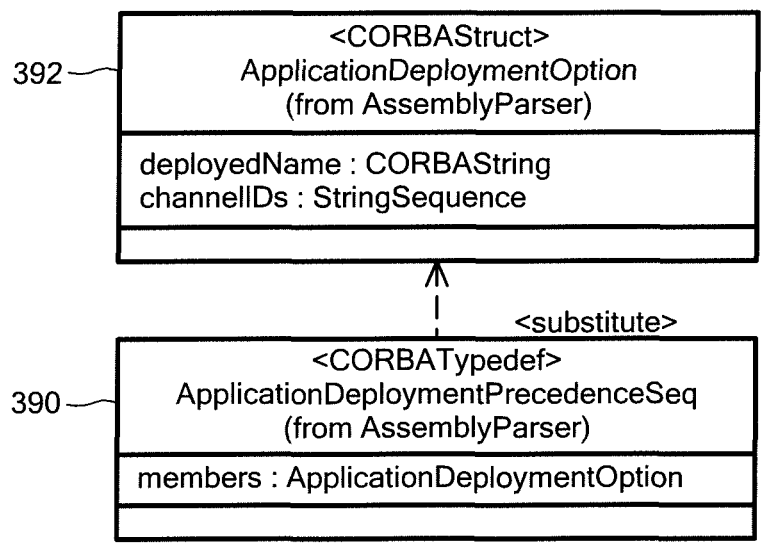
Figure 3F:
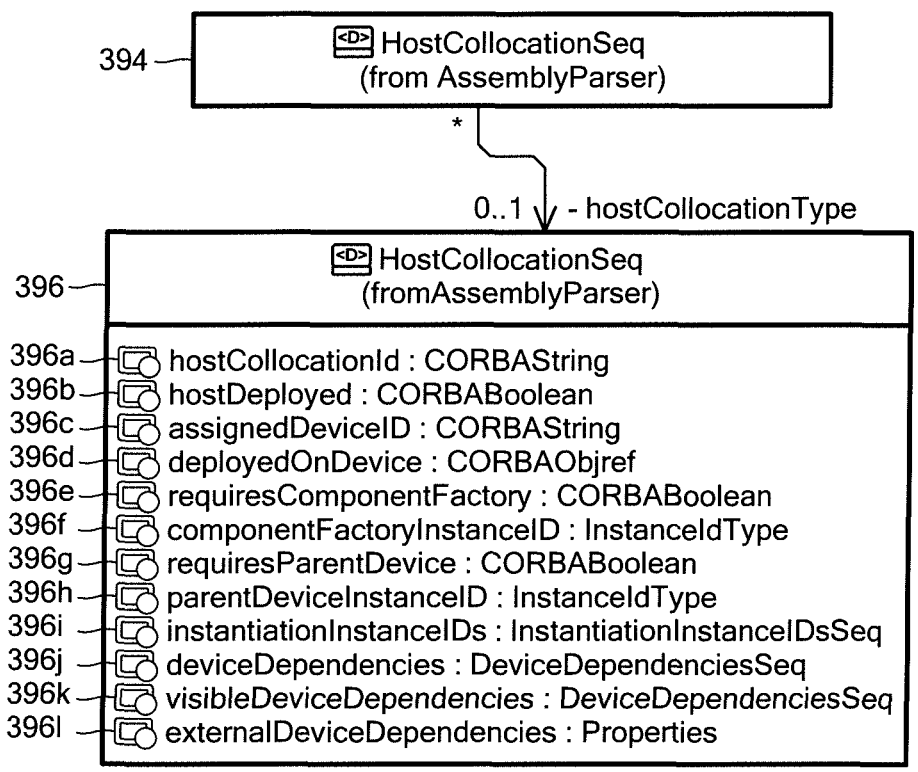

FIGS. 3-3F show exemplary optimized parser IDL types that can be used to generate, parse, and use optimized SCA descriptors 110 (FIG. 1). Thus, whereas the pre-parser types shown in FIGS. 2-2C are typically used only within the offline environment 102, the optimized types of FIGS. 3-3F are for use within both the offline environment 102 and target environments 104. It will be appreciated from the description provided herein that several of the optimized parser types are the same as or similar to several of the pre-parser types shown in FIGS. 2-2C. Advantageously, in some embodiments, the pre-parser interfaces 200 (FIG. 2) are based upon and/or includes portions of the optimized types shown in optimized parser IDL (FIGS. 3-3F). For simplicity and clarity of explanation, only certain differences between such types are discussed hereinbelow.

Referring now to FIG. 3, exemplary optimized parser interfaces and structures 300 may be used within the pre-parser tools, to generated optimized SCA descriptors, and within the optimized parser, to parse the optimized descriptors. The interfaces 300 include an optimized SAD structure 312, an optimized DCD structure 314, and an optimized DMD structure 316, as shown. In embodiments, the optimized SCA descriptors 110 (FIG. 1) comprise octet-encoded CDR representations of the SAD 312, DCD 314, and DMD 316 structures, encoded using a CORBA codec 102c. The optimized parser interfaces 300 further include a SoftwareAssemblyParser interface 302, a DeviceConfigurationParser interface 304, and a DomainManagerConfigurationParser interface 306 to parse the optimized SAD, DCD, and DMD structures, respectively. The SoftwareAssemblyParser 302, DeviceConfigurationParser 304, and DomainManagerConfigurationParser 306 interfaces may implement a respective parseFile( ) operation (defined in a parent Parser interface 319) to decode and/or parse SAD 312, DCD 314, and DMD 316 structures, respectively. In exemplary embodiments, the SAD 312, DCD 314, and DMD 316 structures include sufficient run-time information such that these structures can be used directly by the CF implementation 120 and separate run-time CF implementation representations are not required.

In some embodiments, the optimized parser interfaces 300 further include a SoftwarePackageParser interface 308 and a PropertiesParser interface 310. These interfaces contain types that are used for offline and run-time.

The optimized SoftwareAssemblyParser interface 302 is similar to the pre-parser SoftwareAssemblyParser interface 202 (FIG. 2), however, whereas the pre-parser assemblyControllerID 202a may use a string to identify a component instantiation, the optimized parser assemblyControllerId 302a uses an InstanceIdType (defined to be an integer type), which is used as a direct index into partitions (i.e. a sequence of component placements and/or assembly placements). Thus, whereas existing CF implementations perform a computationally expensive search to find the referenced component or assembly instantiation, the CF implementation described herein can directly access the component/assembly instantiation. In embodiments, the pre-parser tools 102a convert the string instantiation ID to a direct index. Thus, it should be appreciated that certain computationally expensive searches can be performed within the offline environment and do not need to be performed within the target environment. In addition, the pre-parser externalPorts 202b uses a pre-parser ExternalPortsSequence type 240, whereas the optimized externalPorts 312g uses an optimized ExternalPortsSequence 380 (FIG. 3D), as discussed further below.

The DeviceConfigurationParser 304 and DomainManagerConfigurationParser 306 interfaces are similar to the DeviceConfigurationParser 204 and DomainManagerConfigurationParser 206 interfaces, respectively, which are discussed above in connection with FIG. 2.

The optimized DMD structure 316 includes a SCA version compatible indicator 316f to provide backwards or forwards compatibility supported between different SCA versions. For example, the indicator 316f may indicate that a domain manager based on SCA 4 (e.g. 4.0.1) is backwards compatible with waveform applications based on SCA 2 (e.g. 2.2.2), or vice-versa. The DomainManagerConfigurationParser 306 includes a corresponding SCA version compatible indicator 306f.

The SoftwareAssemblyParser 302 and DeviceConfigurationParser 304 interfaces inherit from an AssemblyParser interface 318, which is similar to the pre-parser AssemblyParser interface 216 of FIG. 2. It will be appreciated that certain information not needed for deployment is excluded from the optimized AssemblyParser interface 318, such as the description 216a. Also, the componentFiles 216b included within the pre-parser interface 216 are not needed because the corresponding SPDs are processed offline and the information is placed into the optimized parser types.

The SoftwareAssemblyParser 302, DeviceConfigurationParser 304, and DomainManagerConfigurationParser 306 interfaces inherit from the Parser interface 319, which defines a parseFile( ) operation. The optimized parser 120b (FIG. 1) includes implementations of the parseFile( ) operation that receive optimized SCA descriptors 110 (specified by the "profileName" parameter) and decodes/parses the descriptors using the CORBA codec 120c in conjunction with the optimized CORBA types 300. In one embodiment, the SCA version, identified by a sadVersion 312i may be used in conjunction with the compatibility flag 316f to indicate whether or not an SCA application version can be installed and deployed within a CF implementation.

The optimized SAD structure 312 and DCD structure 314 include respective hostCollocations sequences 312d, 314d which use an optimized HostCollocationSeq type 394 discussed below in connection with FIG. 3F. The optimized SAD structure 312 further includes an assemblyControllerID 312e which comprises a direct index to the assembly controller component instantiation. The structure 312 also includes externalPorts 312g which uses the optimized ExternalPortsSequence type 380, discussed below in connection with FIG. 3D.

As is known in the art, CORBA sequence types allow one to change ownership of who is managing the sequence buffer pointer and to set a sequence with a specific sequence buffer pointer to manage.

In an exemplary embodiment, shown in FIG. 3, certain sequences within the optimized parser interfaces are provided as "inout" operations (i.e. operations having a CORBA "inout" parameter) instead of "readonly" members. For example, an externalPorts sequence 302b and a deploymentPrefs sequence 302c within the optimized SoftwareAssemblyParser interface 302; a fileSystemNames sequence 304b within the DeviceConfigurationParser interface 304; a channels sequence 306g and a services sequence 306h within the DomainManagerConfigurationParser interface 306; and a connections sequence 318c, a partitions sequence 318d, and a hostCollocations sequence 318e within the AssemblyParser interface 318 are provided as an "inout" operations. This allows the CF implementation 120 to avoid copying the sequence data from the optimized interfaces 300 to a client during run-time and, instead, change ownership of the sequence to the client. This technique may be used, for example, within the SoftwareAssemblyParser interface 302, the DeviceConfigurationparser interface 304, and the DomainManagerConfigurationParser interface 306, as shown in FIG. 3.

Referring now to FIG. 3A, a PartitionsSequence type 320 represents a sequence of placement types (which correspond to component and/or assembly instantiations) within a software assembly and/or a device configuration. In one embodiment, the PartitionsSequence type 320 is used within the pre-parser interfaces 200 (i.e. within the pre-parser AssemblyParser interface 216) and also within the optimized interfaces 300 (i.e. within the optimized AssemblyParser interface 318). Thus, the PartitionsSequence type 320 may generally correspond to a <partitioning> element within a <softwareassembly> or a <deviceconfiguration> element, although it will be appreciated that the PartitionsSequence type 320 includes several optimizations not present in a Domain Profile, as discussed hereinbelow.

The PartitionsSequence 320 includes a sequence of PlacementType unions 322, each of which may correspond to either a <componentplacement> element or an <assemblyplacement> element. The PlacementType union 322 includes a switchType 322a, a componentPlacement 322b, and an assemblyPlacement 322c. As specified by the enumerated switchType 322a, a PlacementType 322 corresponds to either a <componentplacement> or an <assemblyplacement> element, using a ComponentPlacementType structure 324 or an AssemblyPlacementType structure 326, respectively.

It should be appreciated that, in accordance with the SCA Specification, a <partitioning> element with a SAD or a DCD describes one or more component instantiations. The component instantiations can be grouped using <componentplacement> and/or <hostcollocation> elements, and thus a <partitioning> element is generally a multi-dimensional ("nested") structure.

The ComponentPlacementType structure 324 corresponds to a single component instantiation. Thus, whereas a <partitioning> element is generally a nested data structure, a corresponding PartitionsSequence 320 is a flat data structure which advantageously allows component and assembly instantiations (via placement types) to be directly referenced within a partition sequence using an integer type (e.g. InstanceIdType). The ComponentPlacementType structure 324 includes several members which are not present in a <componentplacement> element, but are provided as run-time additions, including an isComponentFactory boolean 324d, a deployondevice string 324h, a deployedOnDevice CORBA object reference 324i, a requiresParentDevice boolean 324j, and a parentDeviceInstanceID 324k, which uses the optimized InstanceIdType to allow direct indexing into a partitions sequence. Typically the parentDeviceInstanceID 324k is set if and only if the requiresParentDevice boolean 324j is set to true.

It should be appreciated that a <componentplacement> refers to a SPD, which may describe several different component implementations. As discussed above in connection with FIG. 1, the pre-parser tools 102a can be configured to select an applicable implementation, using the TEIDs 108 (FIG. 1), and include only that implementation in the optimized SCA descriptors. Accordingly, a ComponentPlacementType structure 324 refers to a single component implementation with an implementation member 324g, which uses an ImplementationType structure 332 shown in FIG. 3B and described below in connection therewith.

A ComponentPlacementType structure 324 refers to a ComponentInstantationType structure 328 via a componentInstantation member 324e. The ComponentInstantationType structure 328 generally includes information associated with a <componentinstantiation> element and additional run-time information, including a servicename 328d, a servicetype 328e, an isStaticRef boolean 328k, an objectRef 328l, a processID 328m, an isDeployed boolean 328n, and an isRegistered boolean 328o. A ComponentInstantationType structure 328 further includes a findcomponent 328f, which uses a FindComponentType union 327, and allocationProperties 328j, which uses a DeviceDependenciesSeq type 336 shown in FIG. 3B and described below in connection therewith.

The ComponentInstantationType structure 328 also includes initialConfigurationProperties 328g, executableProperties 328h, and optionProperties 328i which are optimized properties structures built by the pre-parser tools according to methods described in the '761 application.

The FindComponentType union 327 generally corresponds to a <findcomponent> element within a <componentinstantiation> element and uses a FindComponentMechanismType enumeration 321, a ComponentNameBindingType structure 323, and a ComponentResourceFactoryRefType structure 325. Notably, the ComponentResourceFactoryRefType structure 325 references a component instantiation directly with an instanceId member 325a which uses the InstanceIdType.

The AssemblyPlacementType structure 326 represents an <assemblyplacement> element (SCA 4.0 and above), which allows a SAD to refer to another, nested assembly. The structure 326 includes assemblyInstantiation 326c, which uses an AssemblyInstantationType structure 329, to capture the deployment details for the instantiated nested assembly. The AssemblyInstantationType structure 329 includes several optimizations: an instanceId 329b comprises a direct index into a partitions sequence; a nestedApplication 329e which is provided as a run-time addition; and deployment dependencies 329f-329h, some of which use an optimized DeviceDependenciesSeq type 336, shown in FIG. 3B and described below in connection therewith.

Referring now to FIG. 3B, an ImplementationType structure 332 generally corresponds to an <implementation> element within a <softpkg> element and is used within the ComponentPlacementType structure 324 of FIG. 3A. The ImplementationType structure 332 includes deviceDependencies 332d, visibleDeviceDependencies 332e, and externalDeviceDependencies 332f, which represent dependencies between the implemented component and other software components and devices. The pre-parser tools 102a may form software dependencies 332c as sequences, in order of dependency load precedence as further described in the '761 application. The deviceDependencies 332d and visibleDeviceDependencies 332e use a DeviceDependenciesSeq type 336, which includes a sequence of AllocationPropertyType structures 334. A usesdevices member 332g generally corresponds to an <usesdevices> within the <implementation> and <softpkg> elements and uses a UsesDeviceTypeSeq type 333, discussed hereinbelow.

As described in the SCA Specification, component and device properties can be defined using <simple> elements (e.g. within a PRF). The <simple> element includes several sub-elements and attributes, only some of which are needed during run-time of a SDR (i.e. by the CF implementation). For example, a <simple> element includes <units> and <range> elements that describe the type of data within the property definition and a <description> element to describe the property; this information is not needed by the CF implementation.

The AllocationPropertyType structure 334 is provided herein as an efficient representation of a <simple> element, and includes only information needed by the CF implementation 120 (FIG. 1) during deployment and run-time. In embodiments, the pre-parser tools 102a convert a <simple> element into an AllocationPropertyType structure 334, disregarding information not needed during run-time (e.g. <description>). The pre-parser tools 102a use information in the <simple> element (e.g. <units> and <range>) to convert the property value into a suitable run-time deployment type such that no type conversion happens during deployment and the type information is not needed within the optimized SCA descriptors.

The UsesDeviceTypeSeq type 333 includes a sequence of UsesDeviceType structures 330. The UsesDeviceType structure 330 includes certain information that permit the CF implementation to use this structure directly during run-time, including an assignedDeviceID 330c, a usesDevice object reference 330d, and device dependencies 330e-330g (which are similar to device dependencies 332d-332f in the ImplementationType structure 332, discussed above).

Referring now to FIG. 3C, several types 360, 362, 364, 366, 368, 370, 372, 374, 375, 376, 377, 378, and 379 generally correspond to the types 260, 262, 264, 266, 268, 270, 272, 280, 282, 284, 286, 288, and 289 (FIG. 2B), respectively. In some embodiments, these types are the same types shared between the pre-parser interfaces 200 and the optimized interfaces 300. In embodiments, the pre-parser tools 102a parse a Domain Profile using the types shown in FIG. 2B and generate optimized SCA descriptors using the types shown in FIG. 3C, performing certain conversions discussed herein. For simplicity of explanation, only certain differences between FIGS. 2B and 3C are discussed herein. Whereas the ConnectionFindPortType union 270 includes string references componentInstantiationRefId 270b, assemblyInstantationRefId 270c, and devicethatloadedthiscomponentref 270d, an optimized ConnectionFindPortType union 370 includes direct indexes 370b, 370c, and 370d, respectively. Whereas the DeviceUsedByType structure 272 includes string references refid 272a and usesrefid 272b, an optimized DeviceUsedByType structure 372 includes direct index 372a and 372b, respectively.

Referring now to FIG. 3D, an ExternalPortsSequence type 380 and a PortType structure 382 are generally optimized versions of types 240 and 242 (FIG. 2A), respectively. For simplicity of explanation, only certain differences between FIGS. 2A and 3D are discussed herein. Whereas the PortType structure 242 includes a string reference componentInstantiationRefId 242d, the optimized PortType structure 242 includes a direct index 382c.

Referring now to FIG. 3E, an ApplicationDeploymentPrecedence type 390 includes a sequence of ApplicationDeploymentOption structures 392 and may be used within the pre-parser SoftwareAssemblyParser interface 202 (FIG. 2) and within the optimized parser SoftwareAssemblyParser interface 302 (FIG. 3).

As described in the SCA Specification, a Domain Profile (or more specifically, SADs and DCDs) may include host collocation constraints. A host collocation constraint indicates that two or more component instantiations must be deployed on the same device (i.e. the components must be collocated). Such constraints are specified using <hostcollocation>, <componentresourcefactoryref> (SCA 2.2.2), and <componentfactoryref> elements (SCA 4.0 and above) within a SAD; and also by <deployondevice>, <compositepartofdevice>, and <componentfactoryref (SCA 4.0 and above) elements within a DCD.

Referring now to FIG. 3F, an optimized HostCollocationSeq type 394 represents one or more host collocation constraints, such as constraints specified using a <hostcollocation> element within a SAD or a <deployondevice> element within a DCD. Although host collocation constraints are specified differently within SADs and DCDs, the host collocation types described herein can accommodate both. The HostCollocationSeq type 394 comprises a sequence of HostCollocationType structures 396, comprising several members that describe a device and the component instantiations collocated on that device. In an exemplary embodiment, the pre-parser tools 102a (FIG. 1) parse a Domain Profile and form HostCollocationType structures 396 based upon the constraints therein. In some embodiments, the pre-parser tools use the TEIDs to determine which <componentplacement> elements are to be collocated by examining the appropriate corresponding <implementation> elements. The HostCollocationType structures 396 are formed into a HostCollocationSeq type 394 and included within the optimized SCA descriptors 110 for use by the CF implementation 120.

A hostCollocationId 396a is a unique identifier for a host collocation constraint. For a SAD, this corresponds to an "id" attribute within a <hostcollocation> element. For a DCD, the pre-parser tools generate a unique identifier. A hostDeployed 396b comprises boolean value indicating whether the host collocation has been deployed. An assignedDeviceID 396c indicates the device (i.e. a device component instantiation within a DCD) assigned for collocating components, and corresponds to an "id" attribute within a DCD <componentinstantiation> element. The assignedDeviceID 396c may be selected offline, based on information in the Domain Profile, or at run-time, based on information in the optimized DCD. A deployedOnDevice 396d comprises a CORBA::Object reference indicating the device object reference that is used for the deployment of the collocated component and assembly instantiations. The deployedOnDevice 396d can be set offline or at run-time.

A requiresComponentFactory 396e comprises a boolean indicating whether the collocated <componentinstantation> elements are deployed using a resource factory (or a component factory for SCA 4.0 and above). A componentFactoryInstanceID 396f indicates a resource/component factory used for component deployment, and is used as a direct index into a partitions sequence for the component factory instance. A requiresParentDevice 396g indicates the parent device dependency that must be deployed before the collocated component instantiations can be deployed and added to that parent device. A parentDeviceInstanceID 396h indicates the parent device as a direct index into a partitions sequence. A sequence of instantiationInstanceIDs 396i comprises direct indexes of the collocated components within a partitions sequence.

A deviceDependencies sequence 396j represents the collective device dependencies of the collocated components instantiations. In one embodiment, the pre-parser tools 102a form implementation device dependencies for each component instantiation (i.e. deviceDependencies 332d within ImplementationTypes 332, shown in FIG. 3B), then merge these sequences to form the host collocation deviceDependencies 396j. Likewise, a visibleDeviceDependencies sequence 396k represents the collective visible device dependencies (i.e. merged visibleDeviceDependencies 332e) of the collocated component instantiations, and an externalDeviceDependencies 396l represents the collective "external" device dependencies (i.e. merged externalDeviceDependencies 332f) of the collocated component instantiations. The device dependency members 396j and 396k use the optimized DeviceDependenciesSeq type 336 shown in FIG. 3B and discussed above in connection therewith.

It should also be appreciated that the pre-parser IDL types shown in FIGS. 2-2C, as well as the optimized parser types 300 shown in FIGS. 3-3F, may include additional members and operations, which, for reasons of clarity, are not shown in the figures.

Figure 4:
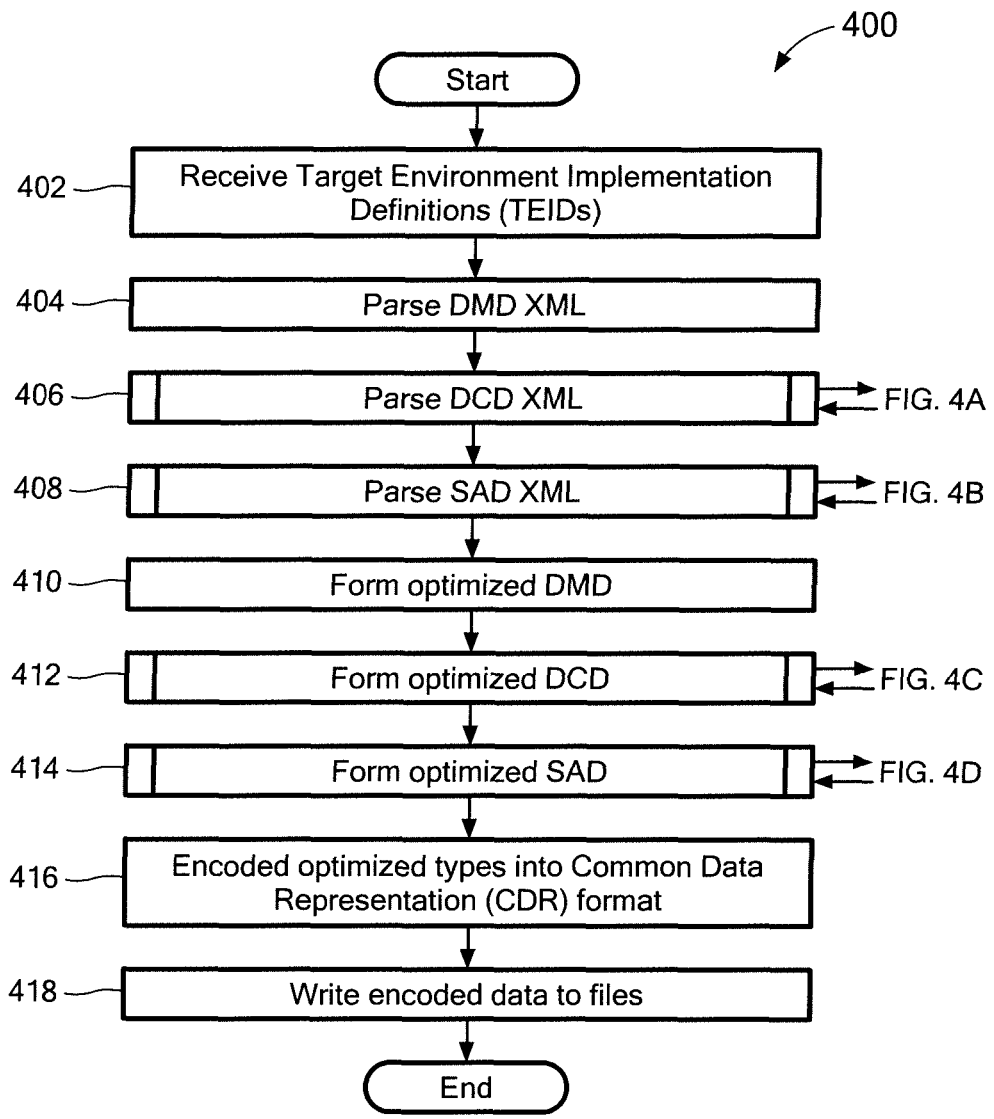
FIGS. 4-4E are flowcharts showing exemplary methods for parsing a SCA Domain Profile and generating corresponding optimized SCA descriptors.
Figure 4A:
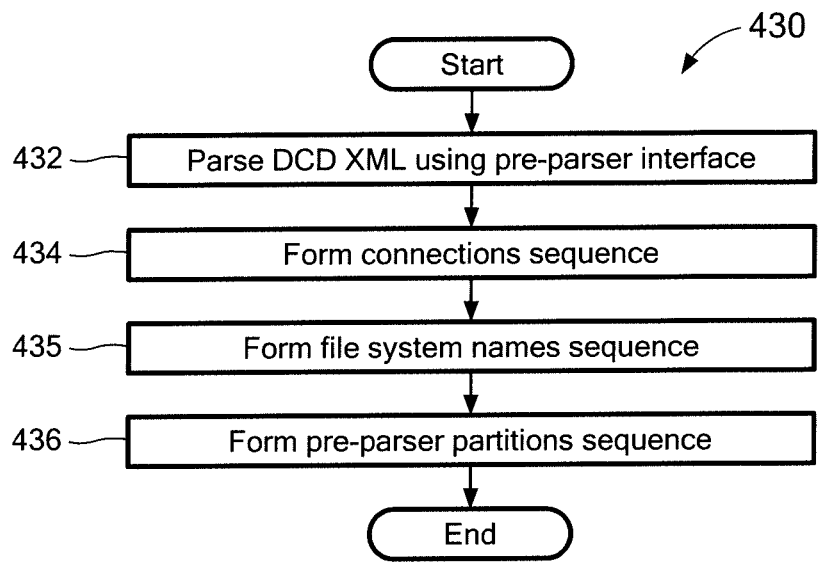
Figure 4B:
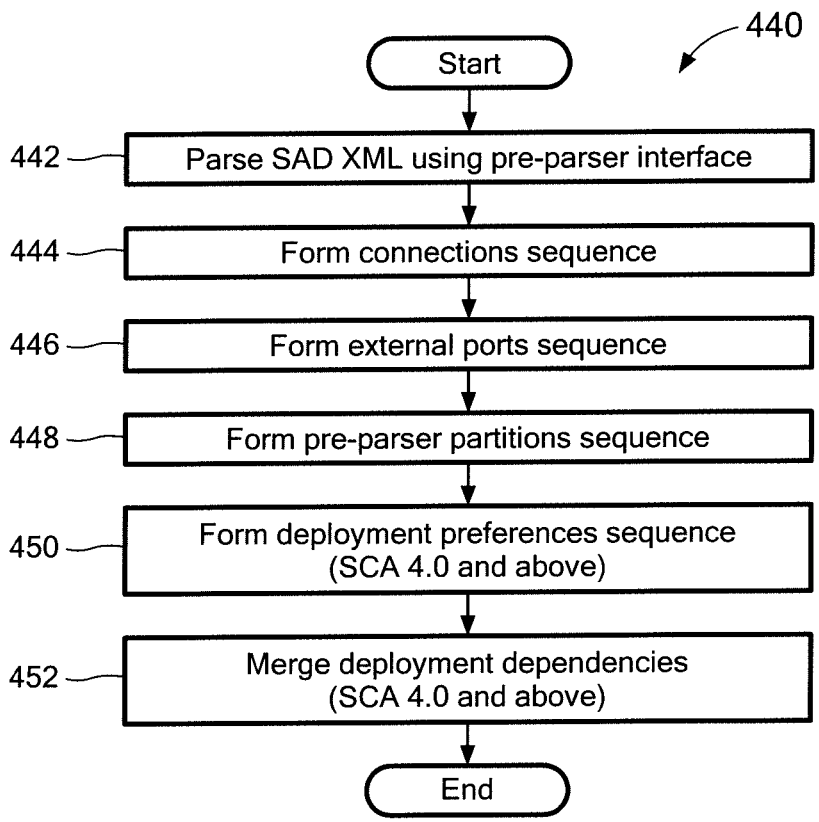
Figure 4C:
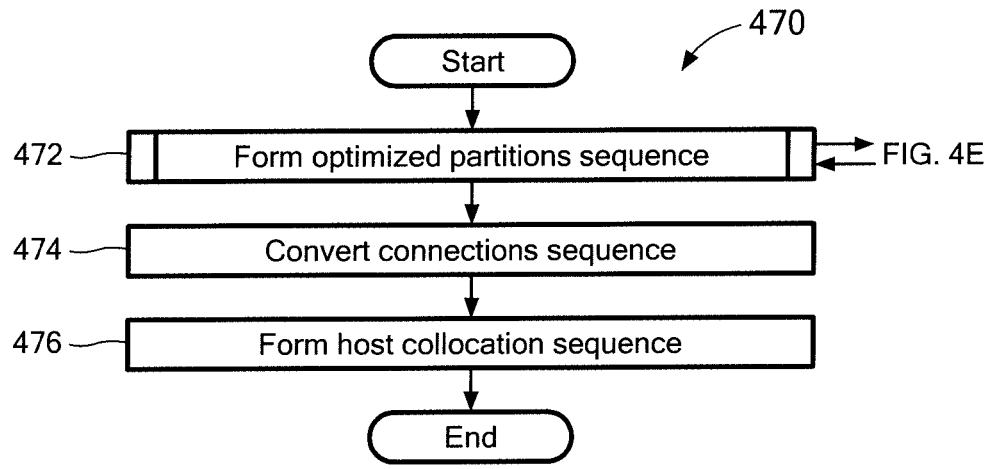
Figure 4D:
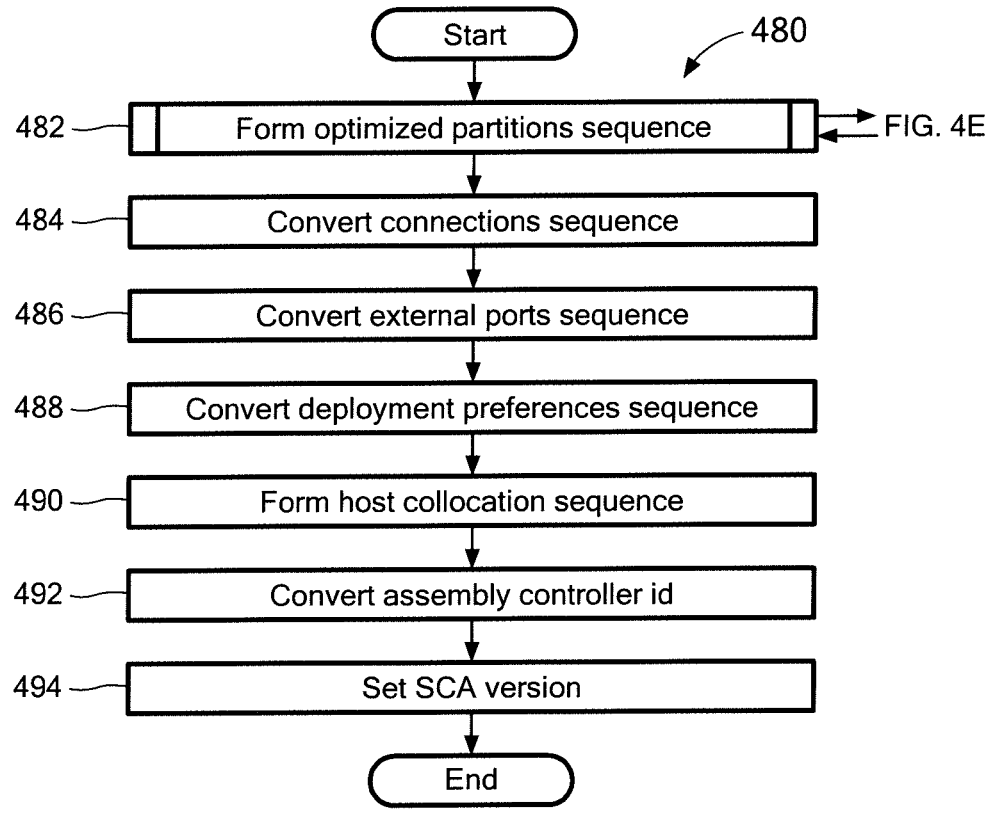
Figure 4E:
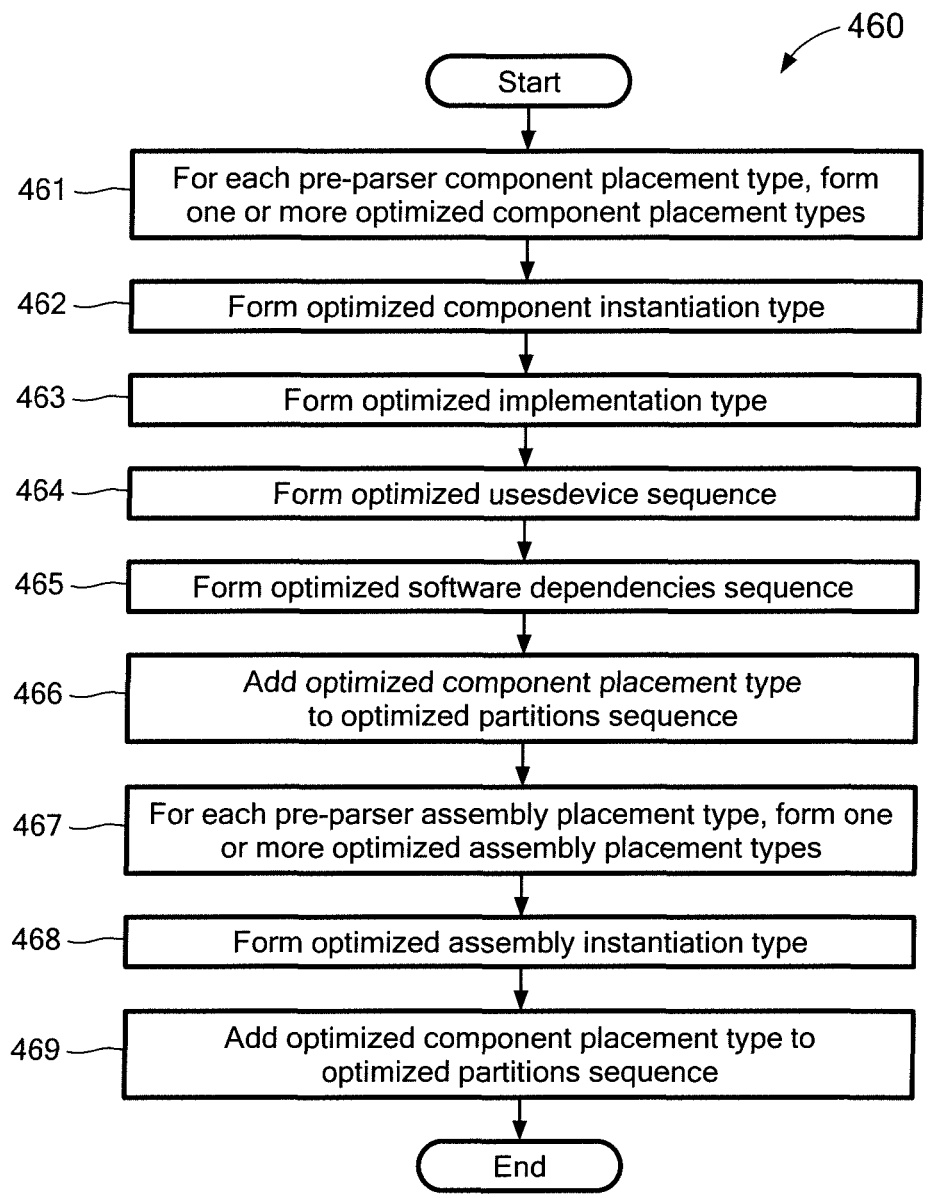

FIGS. 4-4E show exemplary methods for parsing a Domain Profile and generating corresponding optimized SCA descriptors. It should be appreciated that FIGS. 4-4E show flowcharts corresponding to the below contemplated techniques which would be implemented in a computer system, such as system 500 (FIG. 5). In embodiments, the techniques are implemented within an offline environment 102 (FIG. 1). Rectangular elements (typified by element 402 in FIG. 4), herein denoted "processing blocks," represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the steps can be performed in any convenient or desirable order.

Referring to FIG. 4, an exemplary method 400 begins at block 402, where one or more TEIDs are retrieved. The retrieved TEIDs are associated with a given target environment, which may be specified by an operator. At block 404 a DMD is parsed using the pre-parser interface DomainManagerConfigurationParser 206 (FIG. 2). This processing generally includes reading one or more XML files associated with the DMD, parsing the XML files using a COTS XML parser, and adding the parsed information to the interface 206 as member data. At blocks 406 and 408, DCD and SAD XML files are parsed according to sub-methods 430 (FIG. 4A) and 440 (FIG. 4B), respectively, which are described below. It will be appreciated that, after the processing of blocks 402-408 have been performed, the pre-parser tools will have formed a DomainManagerConfigurationParser interface 206, a DeviceConfigurationParser interface 204, and a SoftwareAssemblyParser interface 202, including their respective member data shown in FIG. 2.

At block 410, an optimized DMD structure 316 (FIG. 3) is formed based upon information within the pre-parser DomainManagerConfigurationParser interface 206. In some embodiments, this conversion includes copying the member data between the interface 206 and the structure 316. In an exemplary embodiment, the optimized DMD structure 316 includes an SCA compatibility indicator 316f and block 410 further includes setting this indicator to a true value if the corresponding domain manager is either backwards compatible or forwards compatible, and setting the indicator to a false value otherwise.

At block 412, an optimized DCD structure 314 (FIG. 3) is formed based upon information within the pre-parser DeviceConfigurationParser interface 204 is, according to sub-method 470, discussed below in connection with FIG. 4C. This may include copying member data from the pre-parser interface 204 to the optimized DCD structure 314.

At block 414, an optimized SAD structure 312 (FIG. 3) is formed based upon information within the pre-parser SoftwareAssemblyParser interface 202, according to sub-method 480, discussed below in connection with FIG. 4D. This may include copying member data from the pre-parser interface 202 to the optimized SAD structure 312.

As will be appreciated, after the processing of blocks 410-414 is completed, the pre-parser tools will have formed an optimized DMD structure 316, an optimized DCD structure 314, and an optimized SAD structure 312. At block 416, these optimized types are encoded into CDR format using a CORBA codec 102 (FIG. 1). At block 418, the encoded data is written to one or more files. In one embodiment, the data is written as an octet stream. The files may correspond to optimized SCA descriptors, such as descriptors 110 in FIG. 1.

Referring to FIG. 4A, an exemplary sub-method 430 corresponds to the processing performed in block 406 of FIG. 4. At block 432, a DCD is parsed using the pre-parser DeviceConfigurationParser interface 204 (FIG. 2). This processing generally includes reading one or more XML files associated with the DCD and parsing the XML files using a COTS XML parser. Next, certain parsed information can be added (e.g. copied) directly from the XML parser to the interface 204 as member data, for example the domainManager string 204a. Other information must be formed, as described next.

At block 434, a connections sequence is formed using the pre-parser ConnectionsSequence type 260 (FIG. 2B) and added to the pre-parser interface as member 216c (FIG. 2). At block 435, a file systems names sequence is formed as member 204b (FIG. 2).

At block 436, a partitions sequence is formed using the PrePartitionsSequence type 230 (FIG. 2C) and added to the pre-parser interface as member 216d (FIG. 2). As is known, a DCD may include a plurality of component placements, which refer to SPDs, and each placement may include several implementations. Thus, the processing at block 436 comprises parsing SPD XML files associated with DCD and, if a SPD includes multiple component implementations, selecting the appropriate implementation using the TEIDs retrieved at block 402 (FIG. 4). It should be appreciated that the PrePartitionsSequence type 230 comprises a sequence of placement type structures (i.e. PreComponentPlacementTypes 234 and/or PreAssemblyPlacementTypes 237 in FIG. 2C), each of which includes a sequence of instantiation types (i.e. preComponentInstantations 234e and/or preAssemblyInstantiations 237d in FIG. 2C). Thus, the pre-parser partitions sequence formed at block 436 is a nested data structure.

Referring to FIG. 4B, an exemplary sub-method 440 corresponds to the processing performed in block 408 of FIG. 4. At block 442, a SAD is parsed using the pre-parser SoftwareAssemblyParser interface 202 (FIG. 2). This processing generally includes reading one or more XML files associated with the SAD and parsing the XML files using a COTS XML parser. Next, certain information can be added (e.g. copied) directly from the XML parser to the interface 202 as member data, for example the description 216a (defined in the parent AssemblyParser interface 216 of FIG. 2). Other information must be formed, as described next.

At block 444, a connections sequence is formed using the pre-parser ConnectionsSequence type 260 (FIG. 2B) and added to the pre-parser interface as member 216c (FIG. 2). At block 446, an external ports sequence 202b is formed using the pre-parser ExternalPortsSequence type 240 (FIG. 2A) and added to the pre-parser interface as member 202b (FIG. 2). At block 448, a partitions sequence is formed using the PrePartitionsSequence type 230 (FIG. 2C) and added to the pre-parser interface as member 216d (FIG. 2). The processing at block 448 is similar to the processing performed at block 436 discussed above. At block 450, a deployment preferences sequence is formed using the ApplicationDeploymentPrecedenceSeq type 390 (FIG. 3E) and added to the pre-parser interface as member 202c (FIG. 2).

As described in the SCA 4.0 specification, a SAD may include one more <deploymentdependencies> elements which supply, within its governing scope, overriding values for like-named dependencies defined within the scope. This allows the addition of scope-dependent deployment information.

At block 452, deployment dependencies are merged into the pre-parser partitions sequence formed at block 448. More specifically, the device dependencies are converted to runtime types and merged into the appropriate component placement types, which are determined by the deployment dependency scope. During the merge, deployment dependencies are given the highest precedence order, in accordance with the SCA specification. In embodiments, the dependencies are merged into three separate sequences: all device dependencies, visible device dependencies, and external device dependencies.

It will be appreciated that certain processing blocks (e.g. 452) are only performed for SCA 4.0 and above.

Referring now to FIG. 4C, an exemplary sub-method 470 forms an optimized DCD structure 314 (FIG. 3) based on information parsed using the pre-parser types. The sub-method 470 may correspond to the processing performed at block 412 of FIG. 4. At block 472, an optimized partitions sequence 314c (FIG. 3) is formed based on the pre-parser partitions sequence 216d (FIG. 2) using a sub-method 460, described below in connection with FIG. 4E.

At block 474, the DCD pre-parser connections sequence 216c (FIG. 2) is converted to an optimized connections sequence 314e (FIG. 3). This processing includes converting string references componentInstantiationRefId 270b, assemblyInstantationRefId 270c, and devicethatloadedthiscomponentref 270d within a pre-parser ConnectionFindPortType union 270 to direct indexes 370b, 370c, and 370d, respectively, within an optimized ConnectionFindPortType union 370; and converting a string references refid 272a and usesrefid 272b within a pre-parser DeviceUsedByType structure 272 to direct indexes 372a and 372b, respectively, within an optimized DeviceUsedByType structure 372.

At block 476, an optimized host collocation sequence 314d (FIG. 3) is formed using the HostCollocationType 396 of FIG. 3F. This processing includes using the host collocation and partition information within DCD to determine the placement types that can (or must) be collocated on the same device. The pre-parser tools use the TEIDs to determine which <componentplacement> elements are to be collocated by examining the appropriate corresponding <implementation> elements.

Referring now to FIG. 4D, an exemplary sub-method 480 forms an optimized SAD structure 312 (FIG. 3) based on information parsed using the pre-parser types. The sub-method may correspond to the processing performed at block 414 of FIG. 4. At block 482, an optimized partitions sequence 312c (FIG. 3) is formed based on the pre-parser partitions sequence 216d (FIG. 2) using the sub-method 460 of FIG. 4E.

At block 484, the pre-parser connections sequence 216c (FIG. 2) is converted to an optimized connections sequence 312f (FIG. 3). This processing is similar to the processing of block 474, discussed above in connection with FIG. 4C.

At block 486, the pre-parser external ports sequence 202b (FIG. 2) is converted to an optimized external ports sequence 312g (FIG. 3). This processing involves converting the component instantiation references (e.g. componentInstantiationRefId 242d of FIG. 2A) from a string to a direct index (e.g. componentInstantiationRefId 382c of FIG. 3D).

At block 488, the pre-parser deployment preferences sequence 202c is converted to an optimized sequence 312h. At block 490, an optimized host collocation sequence 312d (FIG. 3) is formed, using techniques described above in connection with block 476 (FIG. 4C).

At block 492, the pre-parser assembly controller id 202a (FIG. 2), which is typically a string value, is converted to an optimized direct index 312e (FIG. 3). At block 494, a SCA version number associated with the parsed SAD is added to the optimized SAD structure 312 as member 312i.

Referring now to FIG. 4E, an exemplary sub-method 460, which forms an optimized partitions sequence based a pre-parser partitions sequence 230, corresponds to the processing performed at block 472 (FIG. 4C) and block 482 (FIG. 4D). Blocks 461-465 are generally repeated for each component placement type in the pre-parser partitions sequence, whereas blocks 467-469 are generally repeated for each assembly placement type in the pre-parser partitions sequence.

At block 461, an optimized ComponentPlacementType 324 is formed for each PreComponentPlacementType 234 (FIG. 2C). At blocks 462 and 463, an optimized ComponentInstantiationType structure 328 and ImplementationType structure 332 are formed, respectively. This processing includes merging software and hardware dependencies associated with the <implementation> element (e.g. <Os>, <processor>, and <dependency> information) into one or more allocation property sequences, such as deviceDependencies 332d, visibleDeviceDependencies 332e, and externalDeviceDependencies 332f (FIG. 3B). The dependency information is merged using the precedence rules specified in the SCA specification and may be converted to run-type types. The formed component instantiation and implementation structures may be associated with, or added to, the component placement type structure formed at block 461.

At block 464, a sequence of usesdevice structures is formed. The usesdevice structures may be the same as or similar to the UsesDeviceType structure 330 of FIG. 3B. Such processing involves converting one or more <usesdevice> elements associated with the selected component. Dependency information may be merged into a deviceDependencies sequence 330e sequence, a visibleDeviceDependencies sequence 330f, and a externalDeviceDependencies sequence 330g (FIG. 3B). The sequence of usesdevice structures can be added to an associated implementation structure, formed at block 463.

At block 465, a sequence of software dependency structures is formed. The software dependency structures may be the same as or similar to the CodeElementType structure 340 of FIG. 3B. Such processing involves converting one or more <softpgk> elements associated with the selected component implementation into a single precedence list in order of loading dependency software. The sequence of software dependency structures can be added to an associated implementation structure formed at block 464.

At block 466, the formed component placement type is added to a corresponding optimized partitions sequence (i.e. 312c or 314c of FIG. 3). At block 467, an optimized AssemblyPlacementType structure 326 (FIG. 3A) is formed based upon a PreAssemblyPlacementType structure 237 (FIG. 2C). At block 468, an optimized AssemblyInstantiationType structure 329 is formed for each pre-parser AssemblyInstantiationType structure 235 (FIG. 2C). At block 469, the optimized assembly placement type formed at block 326 is added to a corresponding optimized partitions sequence (i.e. 312c or 314c of FIG. 3).

It should be appreciated that the sub-method 460 converts nested pre-parser component/assembly placement structures into flat structure (i.e. a flat sequence), which can be directly indexed using an integer type.

FIG. 5 shows an exemplary computer 500 that can perform at least part of the processing described herein. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

All references cited herein are hereby incorporated herein by reference in their entirety.

Having described exemplary embodiments, which serve to illustrate various concepts, structures and techniques sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A system comprising:
   a non-transitory memory comprising a pre-parser interface and an optimized interface;
   an Extensible Markup Language (XML) parser;
   a Common Object Request Broker Architecture (CORBA) codec; and
   a pre-parser coupled to the memory and the XML parser and configured to receive Software Communications Architecture (SCA) XML files, parse the XML files using the XML parser into pre-parser structures associated with the pre-parser interface, convert the pre-parser structures to optimized structures associated with the optimized interface, and encode the optimized structures into a CORBA Common Data Representation (CDR) using the CORBA codec,
   wherein the optimized structures comprise:
      a sequence of placement structures associated with one or more <componentplacement> and/or <assemblyplacement> SCA XML elements; and
      a referring structure comprising a reference to a placement structure, the reference comprising a direct index into the sequence of placement structures.

2. The system of claim 1 wherein the optimized interface includes one or more operations to access a CORBA sequence without copying the sequence.

3. The system of claim 1 wherein the referring structure is associated with one of a <componentinstantation>, <componentfactoryref>, <assemblyinstantiation>, <findcomponent>, or an <implementation> SCA XML element.

4. The system of claim 1 wherein the pre-parser is further configured to convert a string component reference and/or assembly reference to the direct index.

5. The system of claim 1 wherein the optimized structures comprise an implementation structure associated with an <implementation> SCA XML element, the implementation structure comprising a sequence of software dependencies, a sequence of uses devices, a sequence of device dependencies, a sequence of visible device dependencies, and a sequence of external device dependencies.

6. The system of claim 1 wherein the optimized structures comprise a usesdevice structure associated with a <usesdevice> SCA XML element, the usesdevice structure comprising a sequence of device dependencies, a sequence of visible device dependencies, and a sequence of external device dependencies.

7. The system of claim 6 wherein the usesdevice structure further comprises an assignedDeviceID associated with a device component instantiation within a DCD and a usesdevice CORBA object reference.

8. The system of claim 1 wherein at least one of the placement structures comprises one or more of a CORBA object reference, a process id, a service name, a service type, an is static object reference indicator, an is deployed indicator, an is registered indicator, an is component factory indicator, a deploy on device string, a deployed on device CORBA object reference, a requires parent device indicator, and a parent device instantiation id.

9. The system of claim 1 wherein the optimized structures comprise a sequence of host collocation structures having a host collocation id, and a sequence of component instantiation ids, wherein the host collocation id is associated with a <hostcollocation> SCA XML element within a Software Assembly Descriptor (SAD), and one or more of the component instantiation ids is associated with a <componentinstantation> SCA XML element within a SAD.

10. A computer-implemented method comprising:
    receiving Software Communications Architecture (SCA) XML files;
    parsing the XML files, using an XML parser, into pre-parser structures associated with a pre-parser interface;
    converting the pre-parser structures to optimized structures associated with an optimized interface; and
    encoding the optimized structures into a CORBA Common Data Representation (CDR) using a CORBA codec,
    wherein the optimized structures comprise:
       a sequence of placement structures associated with one or more <componentplacement> and/or <assemblyplacement> SCA XML elements; and a referring structure comprising a reference to a placement structure, the reference comprising a direct index into the sequence of placement structures.

11. The method of claim 10 wherein the optimized interface includes one or more operations to access a CORBA sequence without copying the sequence.

12. The method of claim 10 wherein the referring structure is associated with one of a <componentinstantation>, <componentfactoryref>, <assemblyinstantiation>, <findcomponent>, or an <implementation> SCA XML element.

13. The method of claim 10 further comprising converting a string component reference and/or assembly reference to the direct index.

14. The method of claim 10 wherein the optimized structures comprise an implementation structure associated with an <implementation> SCA XML element, the implementation structure comprising a sequence of software dependencies, a sequence of uses devices, a sequence of device dependencies, a sequence of visible device dependencies, and a sequence of external device dependencies.

15. The method of claim 10 wherein the optimized structures comprise a usesdevice structure associated with a <usesdevice> SCA XML element, the usesdevice structure comprising a sequence of device dependencies, a sequence of visible device dependencies, and a sequence of external device dependencies.

16. The method of claim 15 wherein the usesdevice structure further comprises an assignedDeviceID associated with a device component instantiation within a DCD and a usesdevice CORBA object reference.

17. The method of claim 10 wherein the optimized structures comprise a sequence of host collocation structures having a host collocation id, and a sequence of component instantiation ids, wherein the host collocation id is associated with a <hostcollocation> SCA XML element within a Software Assembly Descriptor (SAD), and one or more of the component instantiation ids is associated with a <componentinstantation> SCA XML element within a SAD.

18. The method of claim 10 wherein at least one of the placement structures comprises one or more of a CORBA object reference, a process id, a service name, a service type, an is static object reference indicator, an is deployed indicator, an is registered indicator, an is component factory indicator, a deploy on device string, a deployed on device CORBA object reference, a requires parent device indicator, and a parent device instantiation id.

19. A system comprising:
a non-transitory memory comprising a pre-parser interface and an optimized interface;
an Extensible Markup Language (XML) parser;
a Common Object Request Broker Architecture (CORBA) codec; and
a pre-parser coupled to the memory and the XML parser and configured to receive Software Communications Architecture (SCA) XML files, parse the XML files using the XML parser into pre-parser structures associated with the pre-parser interface, convert the pre-parser structures to optimized structures associated with the optimized interface, and encode the optimized structures into a CORBA Common Data Representation (CDR) using the CORBA codec,
wherein the optimized structures include at least one of:
an implementation structure associated with an <implementation> SCA XML element, the implementation structure comprising a sequence of software dependencies, a sequence of uses devices, a sequence of device dependencies, a sequence of visible device dependencies, and a sequence of external device dependencies;
a usesdevice structure associated with a <usesdevice> SCA XML element, the usesdevice structure comprising a sequence of device dependencies, a sequence of visible device dependencies, and a sequence of external device dependencies; and/or
a sequence of host collocation structures having a host collocation id, and a sequence of component instantiation ids, wherein the host collocation id is associated with a <hostcollocation> SCA XML element within a Software Assembly Descriptor (SAD), and one or more of the component instantiation ids is associated with a <componentinstantation> SCA XML element within a SAD.

20. The system of claim 19 wherein the optimized interface includes one or more operations to access a CORBA sequence without copying the sequence.

* * * * *